(12) United States Patent
Shelekhin et al.

(10) Patent No.: US 6,482,543 B1
(45) Date of Patent: Nov. 19, 2002

(54) ALKALINE CELL WITH IMPROVED CATHODE AND CURRENT COLLECTOR CONFIGURATION

(75) Inventors: Alexander B. Shelekhin, Acton, MA (US); Matthew R. Sylvestre, Lincoln, RI (US); David V. Adamson, Ashland, MA (US); Michael F. Roberts, Braintree, MA (US); Tae-Won Lee, Pearl River, NY (US)

(73) Assignee: The Gillette Company, Boston, MA (US)

( * ) Notice: Subject to any disclaimer, the term of this patent is extended or adjusted under 35 U.S.C. 154(b) by 127 days.

(21) Appl. No.: 09/592,640

(22) Filed: Jun. 13, 2000

(51) Int. Cl.[7] .............................. H01M 4/75; H01M 2/02
(52) U.S. Cl. ...................... 429/164; 429/165; 429/211; 429/238
(58) Field of Search ................................ 429/128, 161, 429/164, 165, 211, 238; 343/812

(56) References Cited

U.S. PATENT DOCUMENTS

| | | | | |
|---|---|---|---|---|
| 323,902 | A | * 8/1885 | Brewer | |
| 1,484,928 | A | * 2/1924 | Benner | 429/238 X |
| 2,605,298 | A | * 7/1952 | Marsal | 429/165 X |
| 2,865,977 | A | * 12/1958 | Moyns | 429/164 |
| 4,250,233 | A | * 2/1981 | Jeanneret | 429/238 X |
| 4,939,048 | A | 7/1990 | Vignand | 429/161 |
| 4,942,101 | A | 7/1990 | Audebert et al. | 429/211 X |
| 5,573,871 | A | * 11/1996 | Von Benda | 429/161 X |
| 5,639,578 | A | 6/1997 | Urry | 429/161 X |
| 5,677,080 | A | 10/1997 | Chen | |
| 5,869,208 | A | 2/1999 | Mick et al. | 429/164 |
| 5,886,672 | A | * 3/1999 | Brune et al. | 343/812 |
| 6,007,936 | A | * 12/1999 | Iwase et al. | 429/164 X |
| 6,074,781 | A | * 6/2000 | Jurca | 429/165 X |
| 6,150,052 | A | * 11/2000 | Urry | 429/164 X |
| 6,235,422 | B1 | * 5/2001 | Kaplan et al. | 429/165 X |
| 6,342,317 | B1 | 1/2002 | Patel et al. | 429/176 |

FOREIGN PATENT DOCUMENTS

| WO | WO 00/30196 | 5/2000 |
|---|---|---|
| WO | WO 01/08244 A1 | 1/2001 |

* cited by examiner

Primary Examiner—Stephen Kalafut
(74) Attorney, Agent, or Firm—Barry D. Josephs; Paul I. Douglas; Thomas G. Krivulka

(57) ABSTRACT

An alkaline cell having an anode comprising zinc and a cathode comprising manganese dioxide wherein the cathode is located annularly along the inside surface of the cell housing and has a plurality of indentations on the inside of its surface facing the cell interior. Each indentation has a wall defining a channel with an opening thereto running preferably in the direction of the cell's length. The channel and opening facing the cell interior filled with anode material. The cell can have an anode current collector, typically of metal, with at least a portion of its surface extending into the cathode indentation channel. The anode current collector can have a portion of its surface extending from a point within the anode and into the cathode indentation channel through said opening. The cell can include a cathode current collector comprising a sheet of conductive material such as a sheet of metal or graphite placed within the cathode, particularly within thick regions of the cathode. The cathode current collector can be used in conjuction with a conventional single nail anode current collector or in combination with the extended surface anode current collectors of the invention. Such alkaline cells exhibit improved performance, particularly under high power application.

27 Claims, 11 Drawing Sheets

ALKALINE CELL WITH IMPROVED CATHODE AND CURRENT COLLECTOR CONFIGURATION

FIELD OF THE INVENTION

The invention relates to electrochemical cells, particularly alkaline cells, having metal current collectors.

BACKGROUND

Conventional alkaline electrochemical cells are formed of a cylindrical housing (casing). The housing is initially formed with an enlarged open end. After the cell contents are supplied, an end cap with insulating plug is inserted into the open end. The cell is closed by crimping the housing edge over an edge of the insulating plug and radially compressing the housing around the insulating plug to provide a tight seal. A portion of the cell housing forms the positive terminal.

The cell contents of a primary alkaline cell ($Zn/MnO_2$ cells) typically contain an anode comprising zinc anode active material, alkaline electrolyte, a cathode comprising manganese dioxide cathode active material, and an electrolyte ion permeable separator, typically comprising a nonwoven material containing cellulosic fibers and polyvinylalcohol fibers. The anode active material comprises zinc particles admixed with zinc oxide and conventional gelling agents, such as carboxymethylcellulose or acrylic acid copolymers, and electrolyte. The gelling agent holds the zinc particles in place and in contact with each other. A single conductive metal nail, known as the anode current collector, is typically inserted into the anode material in contact with the end cap which forms the cell's negative terminal. The nail is conventionally inserted into the anode and located along the cell's central longitudinal axis. The current collector can be welded to the end cap. The alkaline electrolyte is typically an aqueous solution of potassium hydroxide, but other alkali solutions of sodium or lithium hydroxide may also be employed. Preferably there is no added mercury to the anode, that is, the anode is essentially mercury free, thus containing less than 50 parts mercury per million parts total cell weight. The cathode material is typically of manganese dioxide and may include small amounts of carbon or graphite to increase conductivity. Conventional alkaline cells have solid cathodes comprising battery grade particulate manganese dioxide. Battery grade manganese dioxide as used herein refers to manganese dioxide generally having a purity of at least about 91 percent by weight. Electrolytic $MnO_2$ (EMD) is the preferred form of manganese dioxide for alkaline cells because of its high density and since it is conveniently obtained at high purity by electrolytic methods. EMD is typically manufactured from direct electrolysis of a bath of manganese sulfate and sulfuric acid.

In the cathodes of conventional $Zn/MnO_2$ alkaline cells the manganese dioxide composition is typically between about 70 and 87 percent by weight. Particulate graphite and aqueous KOH solution can be added to the manganese dioxide to form a cathode mixture. Such mixtures form a moist solid mix which can be fully compacted into the cell housing using plungers or other such compacting devices forming a compacted solid cathode mass in contact with the cell casing. The cathode material can be preformed into the shape of disks forming annular rings inserted into the cell in stacked arrangement so that their outer surface abuts the inside surface of the cell housing. In such embodiment the cathode inside surface faces the cell's interior. The cell housing typically functions as the cathode current collector. The cathode inside surface is normally smooth and uniform resulting in a cathode having a uniform and constant wall (annular) thickness along the cell's length. The cathode disks can then be recompacted while in the casing. The separator can be placed so that it lines the inside surface of the cathode. The spearator can be inserted as a sheet over the cathode exposed surface or it can be sprayed or coated in liquid form onto the cathode and subsequently dried to form a film as described in commonly assigned copending patent application Ser. No. 09/280,367, filed Mar. 29, 1999. The anode mixture can be inserted into the central void space available within the cathode disks—the separator material being between the anode and cathode surfaces.

There are increasing commercial demands to make primary alkaline cells better suitable for high power application. Modern electronic devices such as cellular phones, digital cameras and toys, flash units, remote control toys, camcorders and high intensity lamps are examples of such high power applications. Such devices require high current drain rates, typically pulsed drain, of between about 0.5 and 2 Amp, more usually between about 0.5 and 1.5 Amp. Correspondingly, they require operation at power demands between about 0.5 and 2 Watt. Modern electronic devices such as cellular phones, digital cameras and toys, flash units, remote control toys, camcorders and high intensity lamps are examples of such high power applications. Thus, it is desirable to provide a way of reliably increasing the useful service life of conventional primary alkaline cells particularly for cells to be used in high power applications.

However, use of the cell in high power application tends to increase polarization effects. Polarization limits the mobility of ion transport within the electrode active material and within the electrolyte. Such polarization can result in a significant portion of the anode and cathode material remaining undischarged, thereby reducing the cell's actual capacity (mAmp-hours) or service life (hours). It is thus desirable to find ways of making the cell more amenable to high power application without significantly increasing polarization effects or otherwise adversely affecting cell performance.

Recent art describes an approach wherein the alkaline cell cathode has passages or tunnels therein for insertion of the anode material, as shown in U.S. Pat. No. 5,869,205. The tunnels are completely surrounded by cathode material which is lined with ion permeable separator material. In another approach the cathode disks appear to have spaced apart cutout or indented regions which run circumferentially along the cathode's inside surface (surface facing the cell's interior) as shown in International publication WO 00/01022. This results in a cathode wall thickness which varies along the cell's length. Alkaline cell cathode disks having cutout or indented regions which appear to run longitudinally along the cathode's inside surfaces are shown in U.S. patent application Ser. No. 09/358,578, filed Jul. 21, 1999, issued Jan. 29, 2002 as U.S. Pat. No. 6,342,317, commonly assigned with the present application. In such design the cathode wall thickness varies circumferentially. Alkaline cells having such indented surfaces provide greater interfacial surface area at the interface between anode and cathode than conventional cells. This reportedly reduces the average current density ($mAmp/cm^2$) at the anode/cathode interface resulting in improved actual capacity (mAmp-hrs), particularly under high power application.

When conventional nail anode current collectors are used with such alkaline cells, however, the average distance between the nail and the cathode surface is typically less than it would e in conventional cells having cathodes of constant wall thickness. This has a tendency to increase the cell's internal resistance during discharge and therefore can result in less than optimum performance.

SUMMARY OF THE INVENTION

Applicant has determined that the performance of alkaline cells having an annular cathode with a lobed, namely an indented (curvilinear) surface can be improved by extending a portion of the anode current collector into the indented area. This reduces the cell's internal resistance, and improves performance extending further the cell's service life, particularly under high power application.

It has also been determined that the performance of alkaline cells having annular cathodes can be improved by employing cathode current collectors which are inserted into the cathode. Such cathode current collectors can be in the form of continuous sheets or disks of electrically conductive material inserted into the cathode. The cathode current collectors are desirably oriented so that they are positioned radially, namely, perpendicular to the cell's central longitudinal axis or positioned so that they run along the length of the cathode, that is, parallel to the cell's longitudinal axis. The cathode current collectors have particular utility when the cathode is of non uniform wall thickness or has an indented or lobed inside surface. The insertion of the cathode current collectors, preferably in the form of conductive sheets or disks improves the cell's service life and energy output, particularly under high power application.

The cathode current collector can desirably be formed of carbon or graphite sheets, graphite sheets with carbon fibers therein, or stainless steel or nickel foil. The material in the form of sheets or panels of polygonal shape, typically rectangular, which can be oriented so that it located within the cathode and extends longitudinally along the cathode length. Alternatively, the cathode current collector can be in the configuration of a disk having an outer edge, a hollow central region and inner edge bounding the hollow region. A plurality of disks can be placed within the cathode in spaced apart arrangement along the length of the cathode. Each disk is preferably oriented so that it is perpendicular to the cell's central longitudinal axis. The outer edge of the disk is preferably in contact with the cell housing. If cathodes having indented inside surface are employed the cathode current collector disks can have an inside edge which can likewise be indented. Thus, when the disk is inserted into the cathode, the indentations on the inner edge of cathode current collector disk will be aligned with the indentations on the cathode inside surface. The cathode current collectors of the invention can be employed independently of the anode current collectors of the invention or can be used in combination therewith. The use of the cathode current collectors of the invention increases the cell's actual capacity and energy output, particularly under high power application.

In one aspect the cell is an alkaline cell having a cylindrical steel housing (casing), an anode comprising particulate zinc and a cathode comprising manganese dioxide, wherein the cathode runs annularly along the length of the inside surface of the housing, wherein the portion of the cathode's inside surface (surface facing the cell's interior) comprises at least one and preferably a plurality of surface indentations. The surface indentations are preferably longitudinal indentations between protruding surfaces or lobes running in the direction of the cell's longitudinal axis, preferably parallel to the cell's longitudinal axis. (The term longitudinal surface indentation as used herein and in the claims shall mean an indentation on the surface of a member, the indentation running at least substantially in the cell's longitudinal direction, that is, in the direction of the cell's length.)

When the cell is assembled the cathode lines the inside surface of the housing forming an annular cathode. Each of said indentations (hereinafter the cathode indentations) preferably runs longitudinally along at least a major portion of the length of the inside surface of the cathode. Each indentation is characterized by being formed of a continuous surface forming the indentation wall defining a lobed surface which can be lined with ion porous separator material. The separator can be inserted as a sheet over the cathode exposed surface or it can be sprayed or dip coated in liquid form onto the cathode and subsequently dried to form a film as described in commonly assigned patent application Ser. No. 09/280,367, filed Mar. 29, 1999, now abandoned. The indentation wall bounded by protruding lobes can be bent, angled or curved and is not closed but rather defines a channel having an opening running along the indentation's length. The indentation opening faces the cell's interior and preferably runs parallel to the cell's central longitudinal axis. When anode active material is inserted into the interior of the cell, there is a pathway from the central portion of the anode through said opening into the indentation channels. The outer portion of the anode material thus fills the indentation channels.

Each cathode surface indentation can itself be formed of flat or curved surface or a combination of flat and curved surface. Each cathode surface indentation is defined by a wall formed of a continual surface which itself can be formed, for example, of connected portions of arcuate surfaces having the same or different radii of curvature. A portion of the indentation wall, thus, can be concave and a portion can be convex when viewed from the cell's central longitudinal axis. The convex portion can form a lobe protruding into the cell interior. The indentation wall itself is preferably formed of a symmetrical surface. If a plurality of indentations are employed, they are preferably of the same size and shape and symmetrically located around the cathode inside surface. It is preferable to locate each indentation so that it runs substantially in the cell's longitudinal direction, preferably, parallel to the cell's central longitudinal axis. The planar axis of symmetry of each indentation channel can intersect the cell's central longitudinal axis. Each indentation channel can typically be oriented along the cathode inside surface so that the cell's central longitudinal axis intersects and lies within the planar axis of symmetry of each channel.

The anode current collector of the invention is formed of a conductive member, typically of metal which has extended surfaces. The anode current collector of the invention is inserted within the anode material so that at least a portion of said extended surface reaches near or into the cathode indentation channel, yet without touching the indentation wall or the ion porous separator lining the indentation wall. A portion of the anode current collector can pass downwardly through the channel opening while being inserted. The anode current collector can be selected from a variety of known electrically conductive metals found to be useful as current collector materials, for example, brass, tin plated brass, bronze, copper or indium plated brass.

In one aspect the annular cathode has a pair of oppositely facing indentations (first and second indentations) on the cathode inside surface. Each indentation has a channel (first and second channels) running longitudinally along the length of the cathode inside surface and preferably parallel to the cell's central longitudinal axis. Each indentation is defined by a indentation wall defining an indentation channel having an opening running along the indentation's length allowing access to the indentation channel from the interior of the cell. There is a protruding surface (lobe) between each indentation. The anode current collector comprises a pair of elongated members (legs) which can be in the form of two or more parallel wires physically connected to each other by a welded or molded brace or other support member, desirably oriented perpendicular to the wires.

Preferably the pair of elongated members can be formed of a wire or nail bent into U-shape. The anode current collector is inserted into the cell's interior (anode) so that one of the elongated members is preferably located within one of the cathode indentation channels and the other is located in said oppositely facing cathode indentation channel when the indentation channels are as deep as shown om FIG. 6. It should be well recognized that if the indentation channels are shallower than as shown in FIG. 6, then the current collector elongated members can be placed adjacent but not necessarily within the indentation channels. The U-shape bend is desirably located at the end of current collector closest to the cell's negative terminal end cap and can be welded to said end cap. Alternatively, the anode current collector can be in the form of a metal or conductive plate or sheet having one edge penetrating into the first cathode indentation channel and the opposite edge penetrating into the second indentation channel. The anode current collector sheet is also desirably placed so that it intersects the cell's central longitudinal axis lies along the channel's planar axis of symmetry.

In another aspect the annular cathode has a plurality of longitudinal indentations on the cathode inside surface. Each indentation has a channel running along the length of the cathode and preferably parallel to the cell's central longitudinal axis. Each indentation is preferably, although not necessarily, of the same size and shape and symmetrically oriented around cathode inside surface. Each indentation is defined by a indentation wall lined with ion permeable separator material defining a channel running along the indentation's length. There is a protruding surface portion (lobe) between each indentation. Each indentation is formed of a continuous wall surface having an opening which faces the cell's interior and allows access into the indentation channel from the interior of the cell. Thus, when the cell is filled with anode active material, the anode material extends into said indentation channels. The anode current collector comprises a plurality of elongated members (legs) which can be in the form of parallel wires physically connected to each other by a welded or molded brace, typically oriented parallel or perpendicular to the wires depending on its design. The anode current collector is inserted into the cell's interior (anode) so that one of the elongated members is located within one of the cathode indentation channels and another is located within another of the cathode indentation channel. Preferably, the anode current collector elongated members are in number equal to the number of cathode indentation channels, so there will be one current collector elongated member (leg) inserted into (or adjacent) each of the cathode indentation channels. The anode current collector is inserted into the cell's interior so that each elongated member is positioned within a respective cathode indentation channel without contacting the indentation wall or ion porous separator lining the indentation wall. The end of the current collector closest to the cell's negative terminal end cap can be welded to said end cap. Alternatively, the anode current collector can be in the form of a plurality of metal or conductive plates or sheets. The plates or sheets can intersect at a common line. The current collector can be inserted into the cell interior so that the outer longitudinal edge of each plate or sheet penetrates into a different one of the indentation channels. The anode current collector is desirably placed so that its central longitudinal axis is parallel to, preferably coincident with the cell's central longitudinal axis. In such orientation each of the current collector plates or sheets cuts a path from the interior of the anode into the cathode indentation channel regions filled with anode material.

Alternatively, the anode current collector can have an antenna shape, that is, can be formed of a central longitudinal elongated member with a plurality of spaced apart (horizontal) elongated members connected perpendicularly to the central longitudinal member. The longitudinal member and spaced apart (horizontal) elongated members connected perpendicularly thereto can be in the form of metallic or conductive wires of the same or varying diameter. When the current collector is inserted into the cell's anode, the exposed end of each spaced apart (horizontal) elongated member penetrates into (or is positioned adjacent) one of the cathode indentation channels. A plurality of the horizontal current collector members are preferably staggered along the length of the central longitudinal member so that when the anode current collector is inserted into the anode, there will be a plurality of horizontal current collector members with an end of each horizontal member penetrating into a respective cathode indentation channels.

The zinc/$MnO_2$ alkaline cell of the invention is essentially mercury free, that is, does not contain any added mercury. Therefore, the cell of the invention has a total mercury content less than about 50 parts per million parts of total cell weight, preferably less than 20 parts per million of total cell weight, more preferably less than about 10 parts per million of total cell weight. The cell of the invention also preferably does not contain added amounts of lead and thus is essentially lead free, that is, the total lead content is less than 30 ppm, desirably less than 15 ppm of the total metal content of the anode.

BRIEF DESCRIPTION OF THE DRAWINGS

The invention is more fully described with reference to the drawings in which.

DETAILED DESCRIPTION

Figure 1:
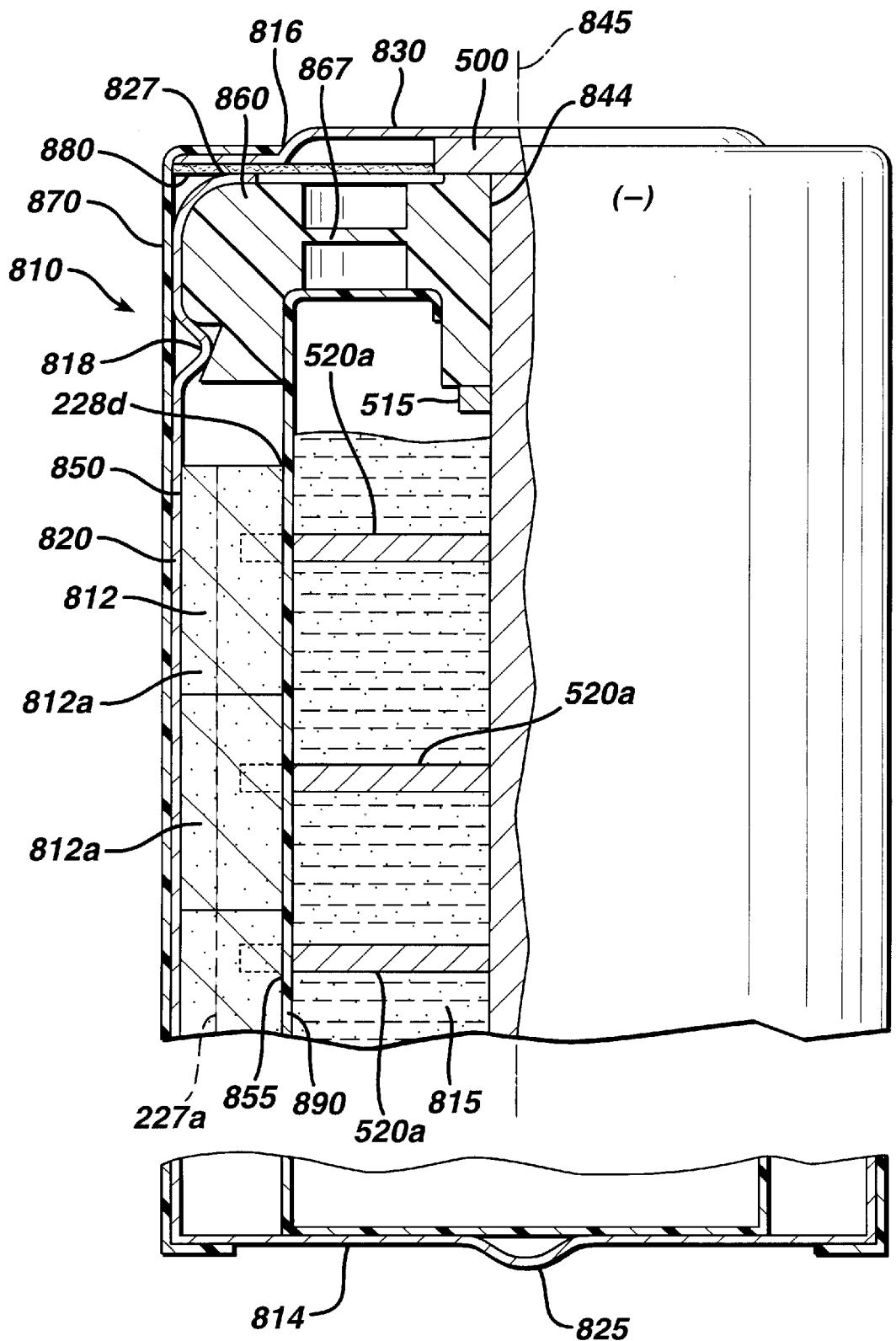
FIG. 1 is a cross sectional elevation view taken through sight lines 1—1 of FIG. 3 of a specific embodiment of alkaline cell of the invention.
Figure 2:
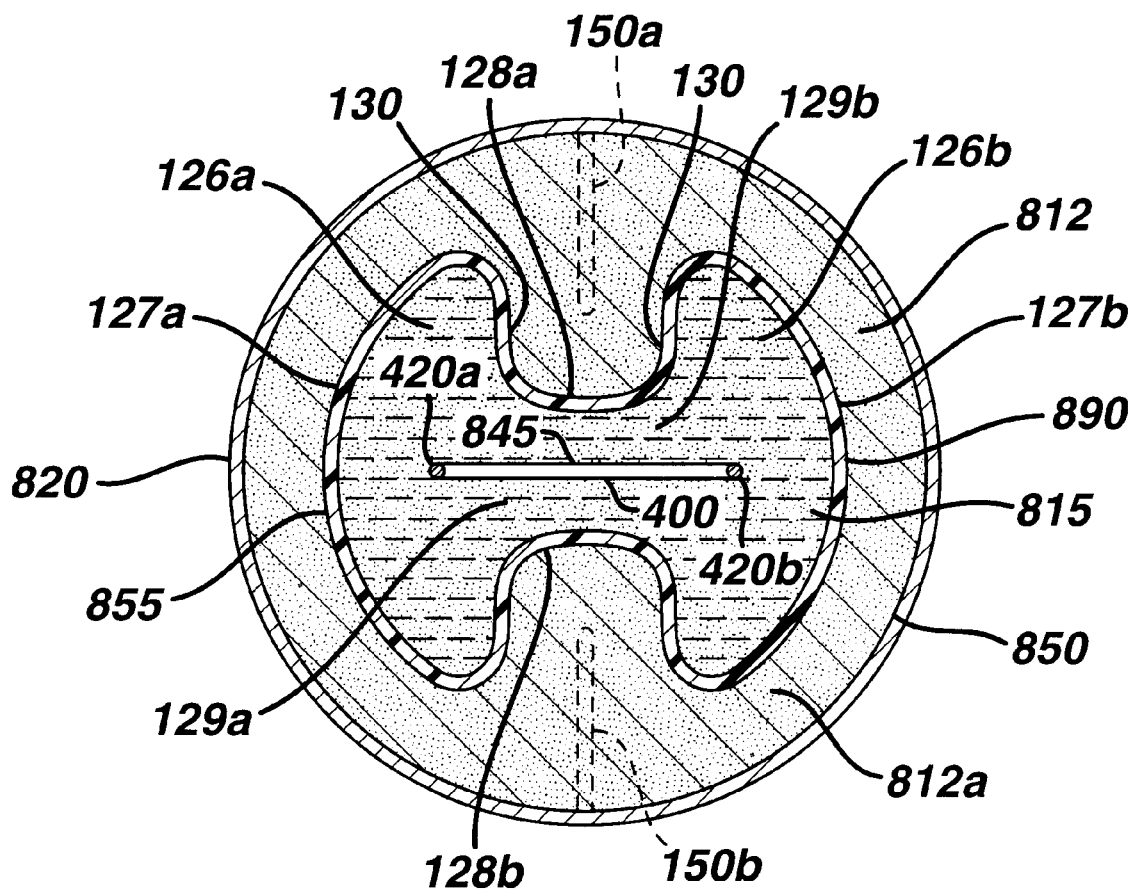
FIG. 2 is a cross sectional plan view of a specific embodiment of an alkaline cell with an annular cathode having two surface indentations and an anode current collector penetrating into said indentations.

A preferred embodiment of the cell of the invention is shown in FIGS. 1 and 2. The alkaline cell 810 has a cylindrical housing (casing) 820, a cathode 812, an anode 815, and separator 890. The cathode 812 is preferably formed of a plurality of stacked disks 812a, however, it can also be formed of single piece. Each cathode disk 812a is placed within housing 820 so that the cathode disk outer surface 850 contacts the housing inside surface. The inside surface 855 of each cathode disk 812a has at least one indentation and preferably a plurality of indentations. The inside surface 855 is thus shaped preferably by a plurality of alternating reverse curves defining the indentations. The embodiment of the cell shown in FIG. 1 can be employed with different number of indentations on the cathode inside surface. For example, the cathode 812 can have a pair of indentations 127a–127b as shown in FIG. 2. Each indentation 127a–127b has a channel 126a–126b, respectively, running along the length of the cathode 812 and preferably parallel to the cell's central longitudinal axis 845. Each indentation 127a–127b is preferably, although not necessarily, of the same size and shape and symmetrically oriented around cathode inside surface 855. Each indentation 127a–127b is defined by an indentation wall defining the indentation channel 126a–126b, respectively, running along the indentation's length. Each indentation 127a–127b is formed of a continuous wall surface having an opening 129a–129b, respectively, which faces the cell's interior and allows access to the indentation channel from the interior of the cell. Each opening 129a–129b preferably has a width between about 0.2 and 0.60 of the housing 820 radius. The cathode inside surface 855 curvature is preferably a closed surface having the symmetrical curvature defining the indentations shown in FIG. 2. The shaped cathode inside surface 855 defining each indentation 127a–127b as shown in FIG. 2 forms two convex shaped surfaces (lobes) 128a and 128b when viewed from the cell's central longitudinal axis. Concave surface portions 127a and 127b are located between convex lobes 128a and 128b. The concave surface portions 127a and 127b are thus spaced apart from each other by the convex lobes 128a and 128b. The convex lobes 128a and 128b are preferably of the same size and shape and concentrically equally spaced as shown in FIG. 2. Similarly the concave surface portions 127a and 127b are preferably of the same size and shape and concentrically equally spaced as shown in FIG. 2. Surface portions 130 form transitions between the alternating convex and concave surfaces. The shaped surface 855 is thus preferably formed of alternating reverse curvatures forming alternating thick and thin regions as shown in FIG. 2. The convex surface portions 128a and 128b define the thicker regions and the concave portions 127a and 127b define the thinner regions. The surface defining each individual indentation is thus continuous but not closed. Each indentation has an opening 129a–129b so that when the cell is filled with anode active material 815, the anode material penetrates into each of the channels 126a–126b as shown in FIG. 2. The channels 126a and 126b as shown in FIG. 2 are of equal size and shape and symmetrically located around the cathode inside surface. Although this is a preferred configuration, it should be appreciated that channels 126a–126b can be of unequal size and shape and can be asymmetrically oriented with respect to each other. Thus, the embodiment shown in FIG. 2 should be considered a preferred embodiment with the realization that modifications with respect to the size, shape and orientation of the channels 126a–126b are possible.

Figure 6:
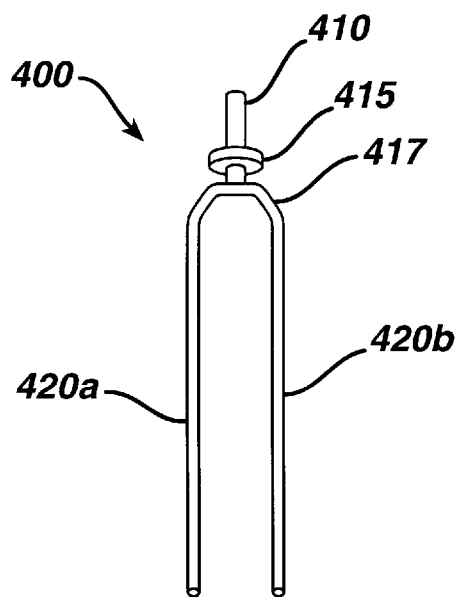
FIG. 6 is a perspective view of an embodiment of the anode current collector of the invention suitable for insertion into a cell having the cathode embodiment shown in FIG. 2.

With respect to the cathode surface configuration shown in FIG. 2 it has been determined that cell performance can be improved by employing an anode current collector which has at least a portion of its surface extending into the channels 126a–126b. The current collector preferably extends into each channel along or on the central longitudinal or planar axis of symmetry of the channel. The current collector extends into each channel without contacting the inside surface of the cathode or separator 890 lining the cathode inside surface The anode current collector surface portions extending into the channels 126a–126b are electrically connected to each other. A preferred embodiment of the anode current collector of the invention is shown in FIG. 6. In this embodiment the current collector 400 comprises two elongated members 420a and 420b which can be in the form of two wires which are physically connected at their top end 417. The anode current collector 400 can be selected from a variety of known electrically conductive metals found to be useful as current collector materials, for example, brass, tin plated brass, bronze, copper or indium plated brass. The elongated members 420a and 420b can be formed of a wire or nail bent into U-shape resulting in the configuration shown in FIG. 6. Elongated members 420a and 420b desirably has a diameter or thickness of between about 0.1 and 0.5 mm. The top of the bend 417 can be physically connected, e.g., by welding to another elongated member or wire 410. Elongated member 410 includes a disk-like flange or bushing 415 positioned along its length. During cell assembly current collector 400 can be inserted through a central cavity 844 within insulating member 860 until flange 415 abuts the bottom surface of insulating member 860. The end of elongated member 410 can be welded to the cellrs terminal end cap 830. When the end cap 830 with current collector 400 attached thereto is inserted over the cell's open end 816, elongated members 420a and 420b will be positioned within channels 126a and 126b, preferably along the channels longitudinal axis of symmetry and will extend axially along the cell's length.

Figure 3:
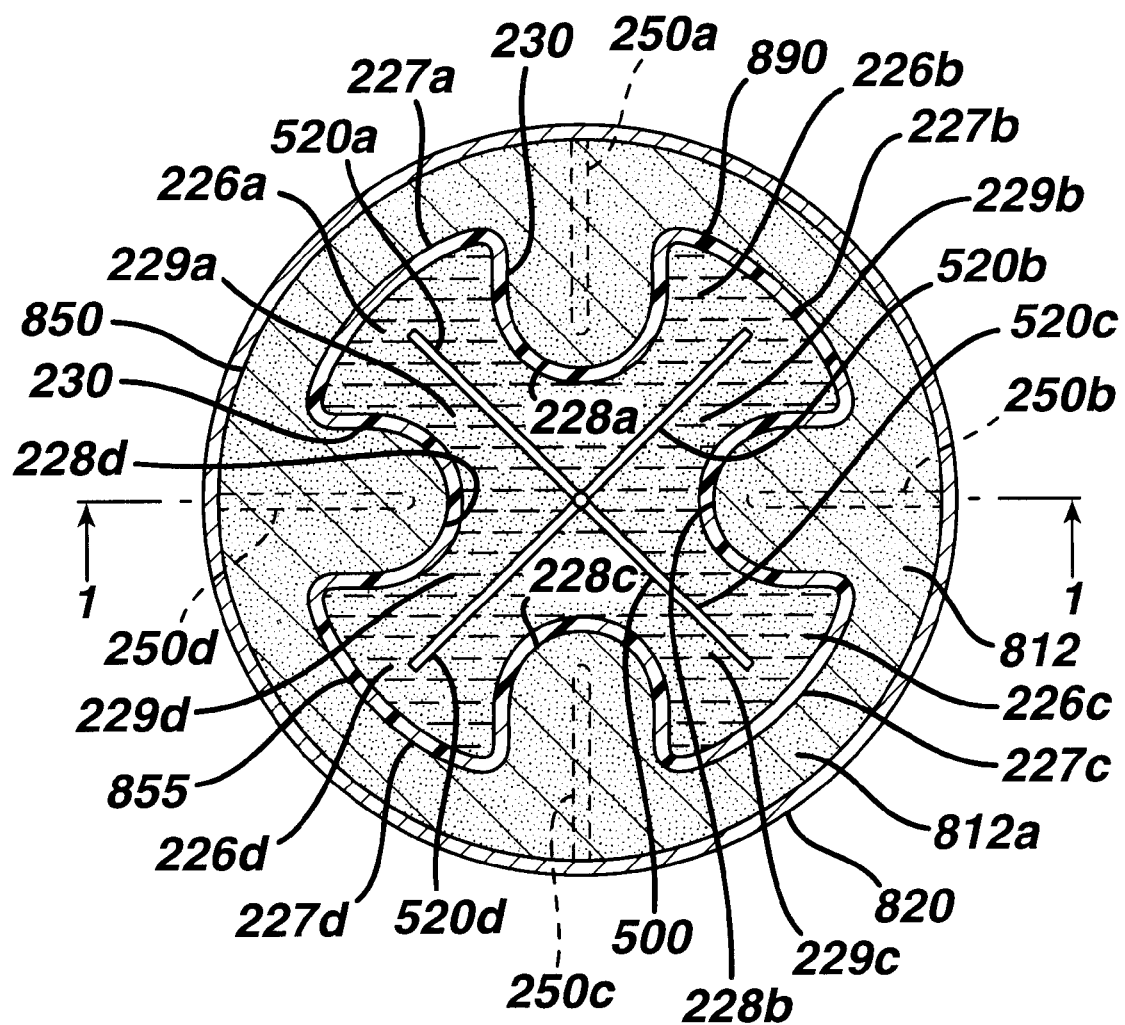
FIG. 3 is a cross sectional plan view of a specific embodiment of an alkaline cell with an annular cathode having four surface indentations and an anode current collector penetrating into said indentations.
Figure 4:
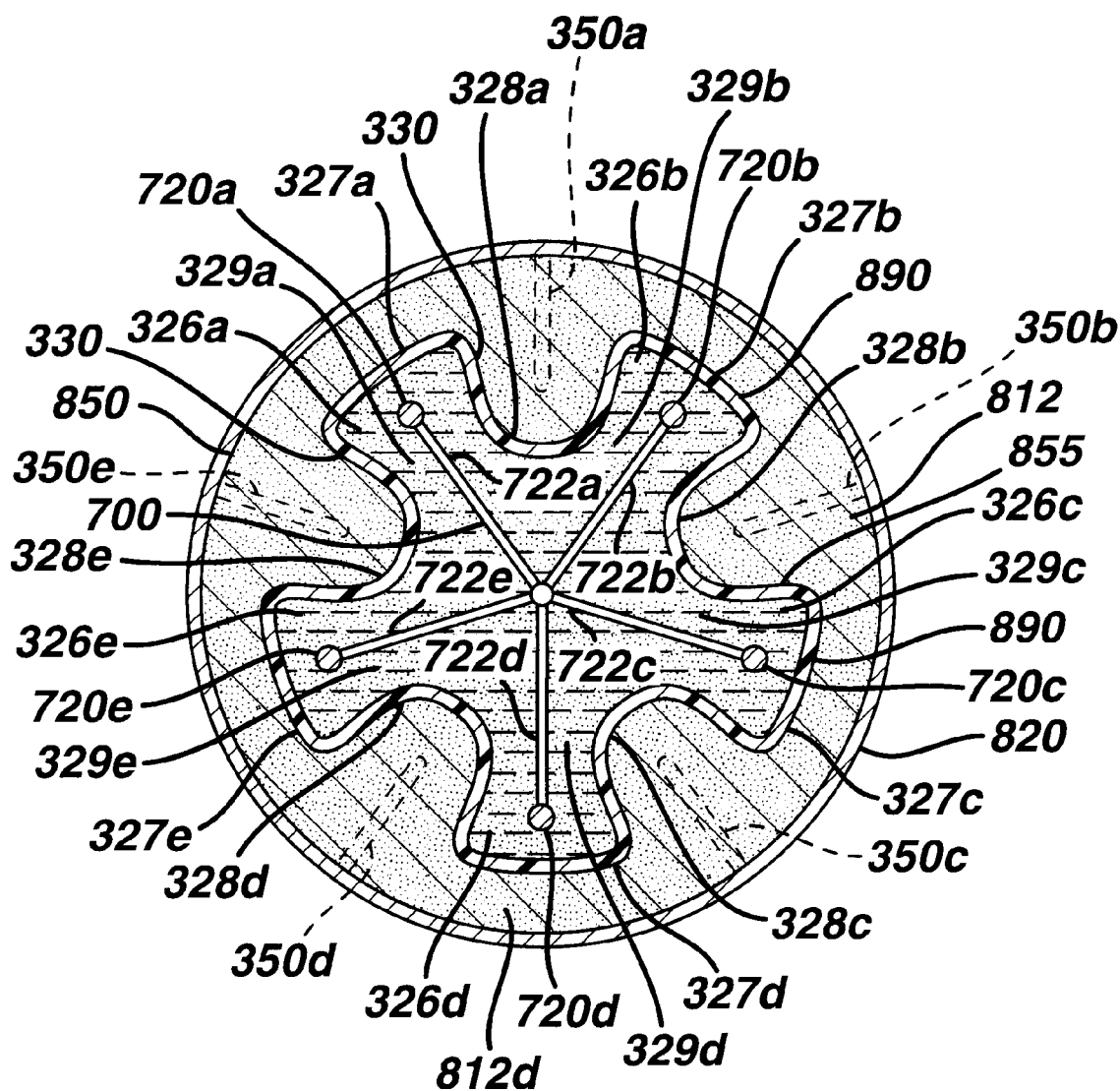
FIG. 4 is a cross sectional plan view of a specific embodiment of an alkaline cell with an annular cathode having five surface indentations and an anode current collector penetrating into said indentations.

Another cathode surface configuration is shown in FIG. 3. This configuration is similar to the configuration described with respect to FIG. 2 except that the inside surface 855 has four indentations. Each indentation 227a–227d has a channel 226a–226d, respectively, running along the length of the cathode 812 and preferably parallel to the cell's central longitudinal axis 845. Each indentation 227a–227d is preferably, although not necessarily, of the same size and shape and symmetrically oriented around cathode inside surface 855. Each indentation 227a–227d is defined by an indentation wall defining an indentation channel 226a–226d, respectively, running along the indentation's length. Each indentation 227a–227d is formed of a continuous wall surface having an opening 229a–229d, respectively, which faces the cell's interior and allows access to the indentation channel from the interior of the cell. Each opening 229a–229d preferably has a width between about 0.2 and 0.50 of the housing 820 radius. The width of each opening 229a–229d is measured by taking the minimum straight line distance between the two opposing protruding surfaces (lobes) defining the respective opening. For, example, the width of opening 229a is determined by taking the minimum straight line distance between the protruding opposing surfaces (lobes) 228a and 228d. The width of each channel openings 129a–129b shown in FIG. 2 and the width of each openings 329a–329e shown in FIG. 4 are also determined in the same manner. The cathode inside surface 855 curvature is preferably a closed surface having the symmetrical curvature defining the indentations shown in FIG. 3. The shaped cathode inside surface 855 defining indentations 227a–227d as shown in FIG. 3 forms four convex shaped surfaces (lobes) 228a–228d when viewed from the cell's central longitudinal axis. Concave surface portions 227a–227d are located between convex lobes 228a–228d. The concave surface portions 227a–227d are thus spaced apart from each other by the convex portions (lobes) 228a–228d. The convex surface portions 228a–228d are preferably of the same size and shape and concentrically equally spaced as shown in FIG. 3. Similarly the concave surface portions 227a–227d are preferably of the same size and shape and concentrically equally spaced as shown in FIG. 3. Surface portions 230 form transitions between the alternating convex and concave surfaces. The shaped surface 855 is thus preferably formed of alternating reverse curvatures forming alternating thick and thin regions as shown in FIG. 3. The convex surface portions 228a–228d define the thicker regions and the concave portions 227a–227d define the thinner regions. The surface defining each individual indentation is thus continuous but not closed. Each indentation has an opening 229a–229d, respectively, so that when the cell is filled with anode active material 815, the anode material penetrates into each of the channels 226a–226d as shown in FIG. 3. The channels 226a–226d as shown in FIG. 3 are of equal size and shape and symmetrically located around the cathode inside surface. Although this is a preferred configuration, it should be appreciated that channels 226a–226d can be of unequal size and shape and can be asymmetrically oriented with respect to each other. Thus, the embodiment shown in FIG. 3 should be considered a preferred embodiment with the realization that modifications with respect to the size, shape and orientation of the channels 226a–226d are possible.

Figure 7:
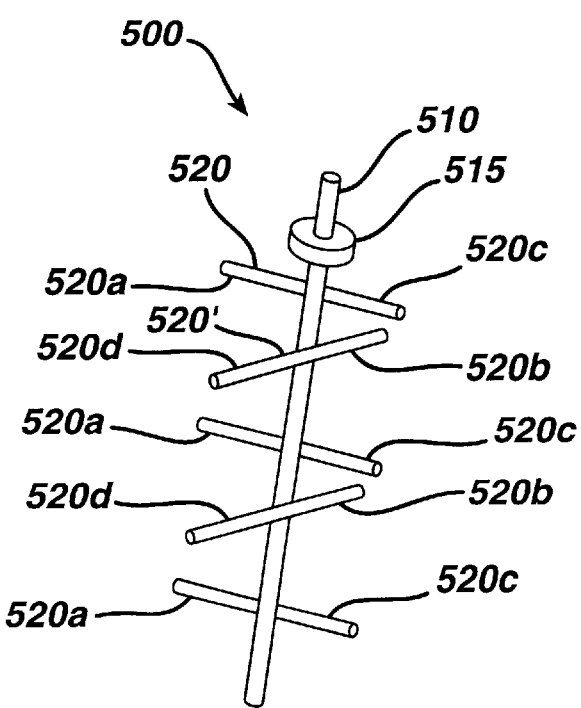
FIG. 7 is a perspective view of an embodiment of the anode current collector of the invention suitable for insertion into a cell having the cathode embodiment shown in FIG. 3.
Figure 8:
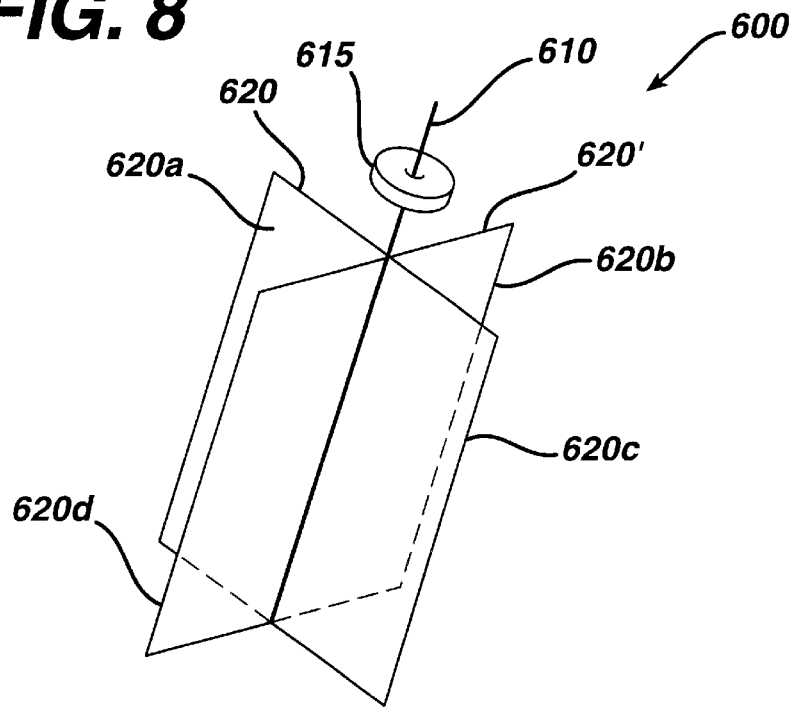
FIG. 8 is a perspective view of another embodiment of the anode current collector of the invention suitable for insertion into a cell having the cathode embodiment shown in FIG. 3.

With respect to the cathode surface configuration shown in FIG. 3 it has been determined that cell performance can be improved by employing an anode current collector 500 which has at least a portion of its surface extending to a position adjacent the channels 226a–226d, preferably into channels 226a–226d. For example, the anode current collector 500 can have at least a portion of its surface positioned at or next to the channel mouth 229a–229d so that it is adjacent to channels 226a–226d, respectfully. It is preferred that the anode current collector 500 extend into the channels 226a–226d, in which case current collector preferably extends into each channel along or on the central longitudinal or planar axis of symmetry of the channel. The anode current collector surface portions can extend into the channels 226a–226d, preferably from a central (axial) portion of the current collector. A preferred embodiment of the anode current collector of the invention is shown in FIGS. 7 and 8. The anode current collector 500 shown in FIG. 7 has an antenna configuration. It can be formed of a single axial member 510, preferably, in the form of an elongated wire or bar having a plurality of horizontally positioned members 520, preferably, in the form of horizontally placed bars or wires spaced apart along the length of axial member 510. Each of the horizontal members 520 are desirably oriented at about right angle to axial member 510. The axial member 510 and horizontal members 520 desirably have a diameter or thickness of between about 0.2 and 1.5 mm. The horizontal members are oriented so that each end thereof will extend into at least one of the channels 226a–226d formed by the cathode surface configuration shown in FIG. 3. The horizontal members 520, preferably extend into each channel along each channel's planar axis of symmetry. Thus, the first horizontal member 520 has opposing end 520a and 520c which will extend from central axial member 510 into channels 226a and 226c, respectively, preferably along each channel's planar axis of symmetry. The current collector extends into each channel without contacting the inside surface of the cathode or separator 890 lining the cathode inside surface. The next horizontal member 520' is oriented at right angles to the first horizontal member 520 so that when the current collector 500 is fitted into the cell, the opposing ends 520b and 520d of member 520' extend into the channels 226b and 226d, respectively, preferably along the channel's planar axis of symmetry. Elongated member 510 includes a disk-like flange or bushing 515 positioned along its length. During cell assembly current collector 500 can be inserted through a central cavity within insulating member 860 until flange 510 abuts the bottom surface of insulating member 860 (FIG. 1). The end of elongated member 410 can be welded to the cell's terminal end cap 830.

An alternative configuration of the anode current collector of the invention is shown in FIG. 8. In this embodiment the current collector 600 is formed of an axial member 610 which may be a thin wire with one or more conductive sheets or panels extending horizontally outwardly from the axial member 610. The anode current collector 600 can be selected from a variety of known electrically conductive metals found to be useful as current collector materials, for example, brass, tin plated brass, bronze, copper or indium plated brass. In the embodiment shown in FIG. 8 there are two panels 620 and 620' intersecting at about right angles to each other extending laterally from axial member 610. The panels 620 and 620' desirably have a diameter or thickness between about 0.1 and 0.5 mm. In this embodiment when the current collector 600 is inserted into the cell, the edge 620a of panel 620 extends into channel 226a and the opposite edge 620c of panel 620 extends into channel 226c. Similarly the edge 620b of panel 620' extends into channel 226b and the opposite edge 620d extends into channel 226d. The current collector panel edges 620a–620d extend into the respective channels 226a–226d, preferably along each channels planar axis of symmetry. The current collector panels extend into each channel without contacting the cathode inside surface or separator 890 lining the cathode inside surface. Elongated member 610 includes a disk-like flange or bushing 615 positioned along its length. During cell assembly current collector 600 can be inserted through a central cavity within insulating member 860 until flange 610 abuts the bottom surface of insulating member 860. The end of elongated member 610 can be welded to the cell's terminal end cap 830.

Another cathode surface configuration is shown in FIG. 4. This configuration is similar to the configuration described with respect to FIG. 3 except that the inside surface 855 has five indentations. Each indentation 327a–327e has a channel 326a–326e, respectively, running along the length of the cathode 812 and preferably parallel to the cell's central longitudinal axis 845. Each indentation 327a–327e is preferably, although not necessarily, of the same size and shape and symmetrically oriented around cathode inside surface 855. Each indentation 327a–327e is defined by an indentation wall defining a indentation channel 326a–326e, respectively, running along the indentation's length. Each indentation 327a–327e is formed of a continuous wall surface having an opening 329a–329e, respectively, which faces the cell's interior and allows access to the indentation channel from the interior of the cell. Each opening 329a–329b preferably has a width between about 0.2 and 0.40 of the housing 820 radius. The cathode inside surface 855 curvature is preferably a closed surface having the symmetrical curvature defining the indentations shown in FIG. 4. The shaped cathode inside surface 855 defining indentations 327a–327e as shown in FIG. 4 forms five convex shaped surfaces (lobes) 328a–328e when viewed from the cell's central longitudinal axis. Concave surface portions 327a–327e are located between convex lobes 328a–328e. The concave surface portions 327a–327e are thus spaced apart from each other by the convex portions 328a–328e. The convex surface portions 328a–328e are preferably of the same size and shape and concentrically equally spaced as shown in FIG. 4. Similarly the concave surface portions 327a–327e are preferably of the same size and shape and concentrically equally spaced as shown in FIG. 4. Surface portions 330 form transitions between the alternating convex and concave surfaces. The shaped surface 855 is thus preferably formed of alternating reverse curvatures forming alternating thick and thin regions as shown in FIG. 4. The convex surface portions 328a–328e define the thicker regions and the concave portions 327a–327e define the thinner regions. The surface defining each individual indentation is thus continuous but not closed. Each indentation has an opening 329a–229e, respectively, so that when the cell is filled with anode active material 815, the anode material penetrates into each of the channels 326a–326e as shown in FIG. 3. The channels 326a–326e as shown in FIG. 4 are of equal size and shape and symmetrically located around the cathode inside surface. Although this is a preferred configuration, it should be appreciated that channels 326a–326e can be of unequal size and shape and can be asymmetrically oriented with respect to each other. Thus, the embodiment shown in FIG. 4 should be considered a preferred embodiment with the realization that modifications with respect to the size, shape and orientation of the channels 326a–326e are possible.

Figure 9:
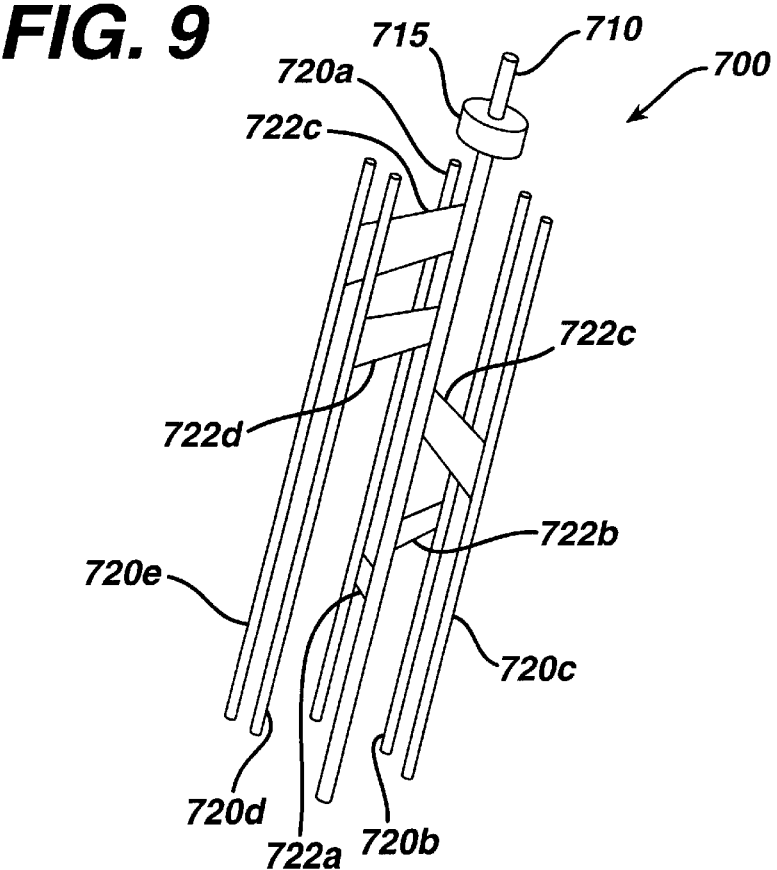
FIG. 9 is a perspective view of an embodiment of the anode current collector of the invention suitable for insertion into a cell having the cathode embodiment shown in FIG. 4.

With respect to the cathode surface configuration shown in FIG. 4 it has been determined that cell performance can be improved by employing an anode current collector which has at least a portion of its surface extending into the channels 326a–326e. The anode current collector surface portions extending into channels 326a–326e are electrically connected to each other. A preferred embodiment of the anode current collector of the invention is shown in FIG. 9. In this embodiment the current collector comprises five elongated members 720a–720e which can be in the form of elongated wires or nails which are physically connected to a central elongated member 710. The cental elongated member 710 can also be in the form of a wire, which preferably is aligned along the central longitudinal axis when the current collector 700 is inserted therein. The elongated members 720a–720e are preferably aligned parallel to the central member 710 and are each connected to the central member 710 by respective connecting members or braces 722a–722e. The connecting members can be welded to the elongated members or cast as an integral portion thereof. Elongated member 710 includes a disk-like flange or bushing 715 positioned near its top end. During cell assembly current collector 700 can be inserted through a central cavity within insulating member 860 until flange 710 abuts the bottom surface of insulating member 860. The end of elongated member 710 can be welded to the cell's terminal end cap 830. When the end cap 830 with current collector 700 attached thereto is inserted over the cell's open end 816, elongated members 720a–720e will be positioned within channels 326a–326e and will extend axially along the cell's length, preferably along the channels longitudinal axis of symmetry and will extend axially along the cell's length. Each elongated member desirably has a diameter or thickness between about 0.2 and 0.5 mm. The elongated members 720a–720e are desirably of brass, tin plated brass, bronze, copper or indium plated brass.

In alkaline cells conventionally the housing provides the cathode current collector. It has been determined herein that alkaline cell performance can be further improved by adding additional cathode current collectors, that is, in addition to the cell housing. Such additional current collectors can take the form of a metal plate or metal mesh such as a stainless steel expanded metal foil composed of EXMET expanded stainless steel available from Exmet Company. Alternatively, the cathode current collector can be composed of carbon, for example carbon black or acetylene carbon black, preferably graphite which can be added to the cathode in strips, sheets, disks, or large clumps. The graphite can be expanded or unexpanded graphite. Such graphite current collector can be added to selective regions within cathode 812. The graphite current collector can desirably be in the form of large scale sheets or large clumps or disks, preferably having a portion thereof in physical contact with the housing 820 so that a highly conductive electrical pathway can be provided from the interior of cathode 812 directly to housing 820. The added conductive pathway reduces the cell's internal resistance, particularly during high power application (0.5 to 2 Watt) and extends the cell's service life. Such additional cathode current collector, if employed, is not intended to replace the graphite powder, which is normally added to cathode mixture in about 5–10 percent by weight.

Figure 10:
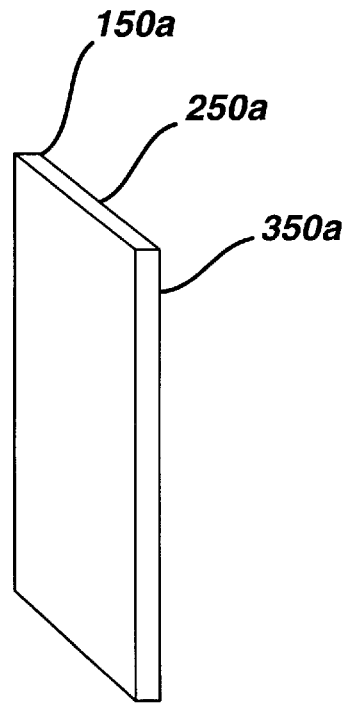
FIG. 10 is a perspective view of an embodiment of the cathode current collector of the invention suitable for insertion into the cathodes shown in FIGS. 2,3, and 4.

The cathode current collector of the invention has particular utility in alkaline cell cathodes of non uniform thickness. Such cathodes, for example, can have can shaped inside surfaces as described herein (FIGS. 2,3, and 4) resulting in some regions which are thicker than others when viewed in cross sections taken perpendicular to the cell's central longitudinal axis. The cathode current collector of the invention can be advantageously located within the thicker regions with a portion of the current collector in physical contact with the cell's housing 820. Specifically, the cathode current collector in the form of a conductive sheet, for example, of stainless steel expanded foil (EXMET metal), nickel metal sheet or nickel mesh, or graphite sheets (FIG. 10) can be located within the thick regions of the cathode 812 shown in FIGS. 2,3, and 4. Namely, cathode current collector in the form of identical sheets or panels 150a and 150b can be located within the thick regions of cathode 812 shown in FIG. 2. The cathode current collector sheets can extend longitudinally along the length of cathode 812 shown in FIG. 2. The cathode current collector sheets are desirably flat or substantially flat and preferably rectangular as shown in FIG. 10. The cathode current collectors 150a and 150b preferably have a thickness between about 0.1 and 0.5 mm. It should be appreciated that such sheets can also be of other shapes such as polygonal or shapes having jagged, curved or bent edges. Similarly, cathode current collectors which can be in the form of identical sheets 250a–250d can be located within the thick regions of cathode 812 shown in FIG. 3. The cathode current collector sheets can extend longitudinally along the length of cathode 812 shown in FIG. 3. The cathode current collector sheets are desirably flat or substantially flat and preferably rectangular as shown in FIG. 10, but can also be of polygonal shape or have jagged, curved or bent edges. The cathode current collectors 250a–250d preferably have a thickness between about 0.1 and 0.5 mm. Cathode current collector which can be in the form of identical sheets 350a–350e can be located within the thick regions of cathode 812 shown in FIG. 4. The cathode current collector sheets can extend longitudinally along the length of cathode 812 shown in FIG. 4. The cathode current collector sheets are desirably flat or substantially flat and preferably rectangular as shown in FIG. 10, but can also be of polygonal shape or have jagged, curved or bent edges. The cathode current collectors 350a and 350e preferably has a thickness between about 0.1 and 0.5 mm. The cathode current collectors of the invention can be placed within the thick regions of the cathode 812 so that it runs along the length of the cathode with one edge in contact with cell housing 820 as shown in FIGS. 2,3, and 4 and an opposite edge extending into the cathode interior. Desirably the cathode current collector does not penetrate through the inside surface of the cathode 812. The addition of said cathode current collectors of the invention to cathodes having the above described indented surface, will enhance the alkaline cell's performance under high power application independently of whether the anode current collectors of the invention are employed. However, the performance of alkaline cells having said indented cathodes (FIGS. 2,3, and 4) will be most improved in high power application (0.5 to 2.0 Watt drain) when both the anode and cathode current collectors of the invention are employed in combination in the same cell.

Figure 11:
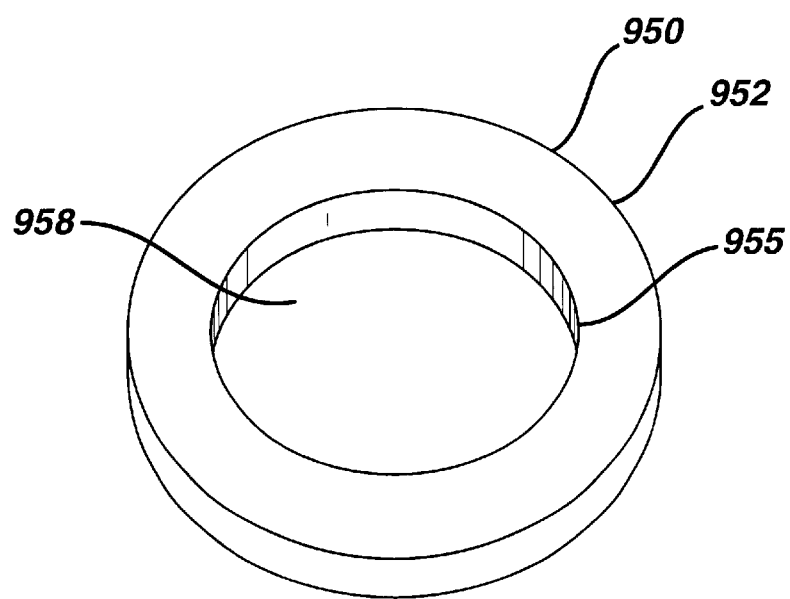
FIG. 11 is a perspective view of an embodiment of the cathode current collector of the invention suitable for insertion into the cathode shown in FIG. 5 or FIG. 13.
Figure 12:
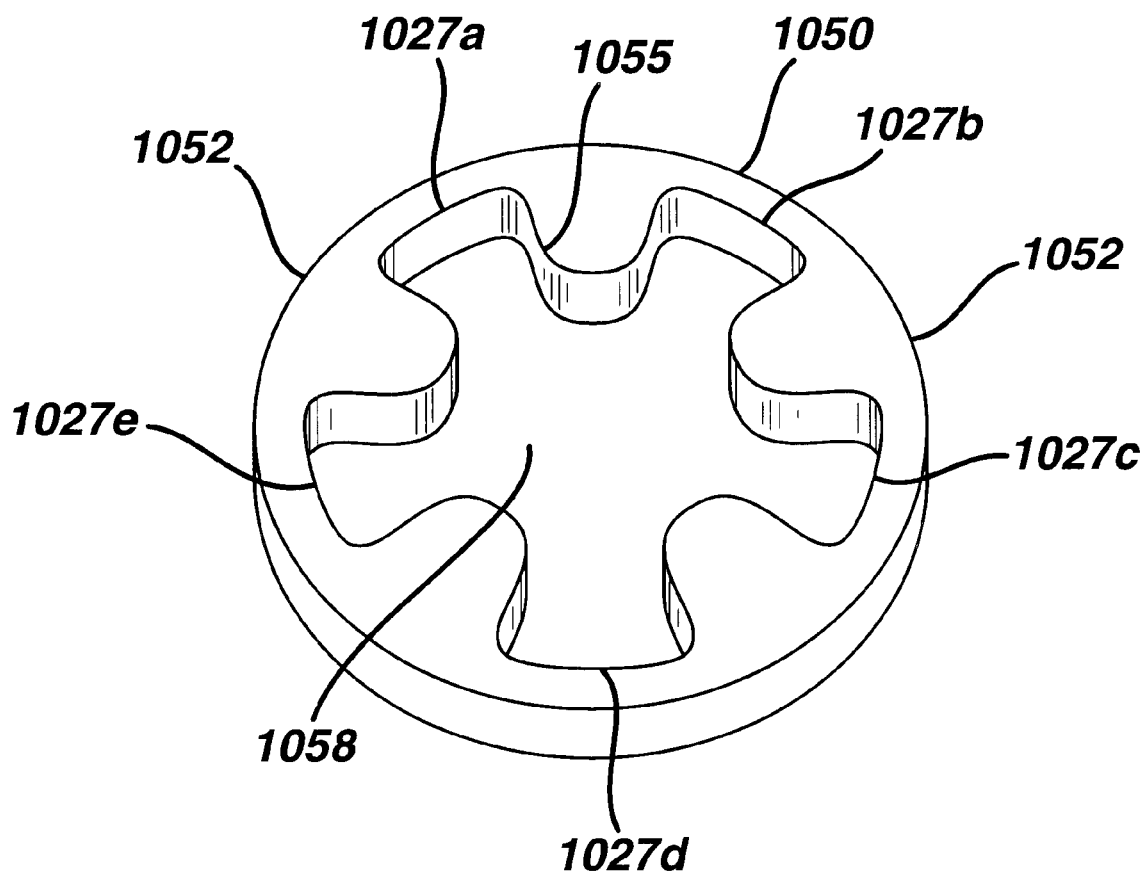
FIG. 12 is a perspective view of an embodiment of the cathode current collector of the invention suitable for insertion into the indented cathode shown in FIG. 4 and FIG. 14.
Figure 13:
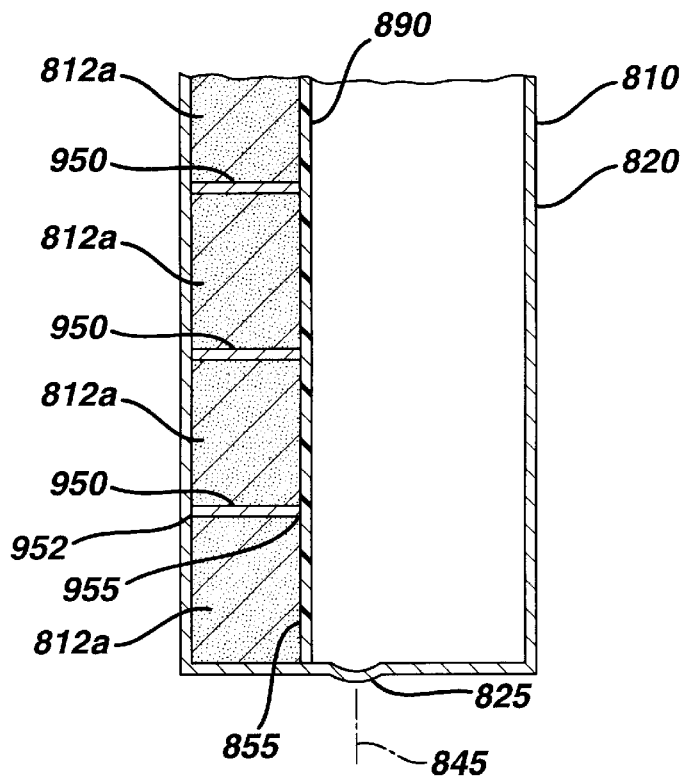
FIG. 13 is a partial cross sectional elevation view of a specific embodiment of alkaline cell having a uniform (nonindented) cathode with cathode current collector disk inserted therein.

Other embodiments of the cathode current collector of the invention are shown in FIGS. 11 and 12. The cathode current collectors 950 and 1050 shown in FIGS. 11 and 12, respectively, are fabricated in the shape of a ring or annular disk. These cathode current collectors are formed of conductive material, desirably stainless steel expanded foil (EXMET metal), nickel metal sheet or nickel mesh, or graphite or graphite containing carbon fibers therein. It has been determined that when such current collector is placed within the cathode so that it is oriented substantially radially an improvement in the cell's performance can be realized, especially under high power application (0.5 to 2 Watt). Desirably the disk shaped cathode current collectors can be located within the cathode 812 so that the plane of the disk is perpendicular to the cell's central longitudinal axis 845. For example, the current collector disks 950 can be placed between conventional cathode disks 812a as shown in FIG. 13. In the embodiment shown in FIG. 13 conventional cathode disks 812a having a smooth (nonindented) inside surface can be employed with the disk shaped cathode current collector 950 of the invention positioned between the individual cathode disks 812a. The disk shaped cathode current collector 950 (FIG. 11) has an outside edge 952, a hollow central region 958, and an inside edge 955 bounding the hollow region 958. The cathode collector disks 950 are easily inserted over each one of the cathode disks 812a after each of the cathode disks 812a are inserted into housing 820. Each of the cathode current collector disks 950 desirably has an outside edge 952 which is close to (within a few millimeter) of the cell housing and preferably is in contact with the cell housing. The cathode disks 950 can thus extend radially from a point at or near the cell housing 820 to a point within the cathode interior, even up to or near to the cathode inside surface 855, but preferably does not penetrate through the cathode inside surface 855.

Figure 14:
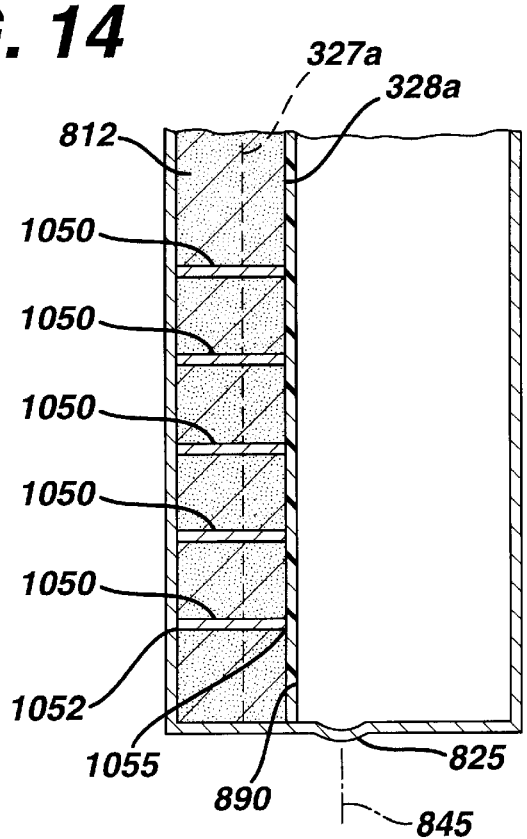
FIG. 14 is a partial cross sectional elevation view of a specific embodiment of alkaline cell having the five indented cathode shown in FIG. 4 with cathode current collector disk of FIG. 12 inserted therein.

If the indented cathodes 812 (FIGS. 2,3, and 4) of the invention are employed the cathode current collector disk can be similarly indented so that when it is inserted radially within the cathode 812 the current collector indentations will be aligned with and run parallel to the cathode indentations. For example, if a five indented cathode 812 (FIG. 4) is employed, the five indented cathode current collector disk 1050 shown in FIG. 12 can be inserted radially within the cathode as shown in FIG. 14. The disk shaped cathode current collector 1050 (FIG. 12) has an outside edge 1052, a hollow central region 1058, and an inside edge 1055 bounding the hollow region 1058. The inside edge 1055 has a plurality of indentations 1027a–1027e. The current collector indentations 1027a–1027e will thus be aligned with the indentations 327a–327e of the cathode. The collector disk 1050 can be of size so that the collector indentations 1027a–1027e extend up to and coincide with the respective cathode indentations 327a–327e in which case the size and dimension of the collector disk in plan view (FIG. 12) will be about the same as the size and dimensions of the cathode in cross section (FIG. 4) taken perpendicular to the cell's central longitudinal axis. The collector disk 1050 (FIG. 12) can also have a width generally smaller than the width of the cathode shown in FIG. 4 so that the collector indentations 1027a–1027e fall between the housing 820 and cathode indentations 327a–327e when the collector disk 1050 is inserted into the cathode. The cathode 812 shown in FIG. 14 can be formed of individual cathode disks with the cathode current collector disk 1050 inserted therebtween. Alternatively, the cathode 812 can be fabricated or molded as a single piece with cathode current collector disks 1050 inserted therein during fabrication. In such case the entire cathode with cathode current collectors 1050 therein can be inserted into the cell housing 820 as a single piece. Each of the cathode current collector disks 1050 desirably has an outside edge which is close to (within a few millimeter) of the cell housing and preferably is in contact with the cell housing. It will be appreciated that if the cathode of the invention has two indentations (FIG. 2) or three indentations (FIG. 3) the cathode current collector disk 1050 (FIG. 12) would desirably have matching two or three indentations, respectively, on its inside surface 1055. The addition of said cathode current collectors disks 1050 (FIG. 12) of the invention to cathodes having the above described indented surface, will enhance the alkaline cell's performance under high power application independently of whether the anode current collectors of the invention are employed. However, the performance of alkaline cells having said indented cathodes (FIGS. 2,3, and 4) can be most improved in high power application (0.5 to 2.0 Watt drain) when both the anode and cathode current collectors of the invention are employed in combination in the same cell.

Figure 5:
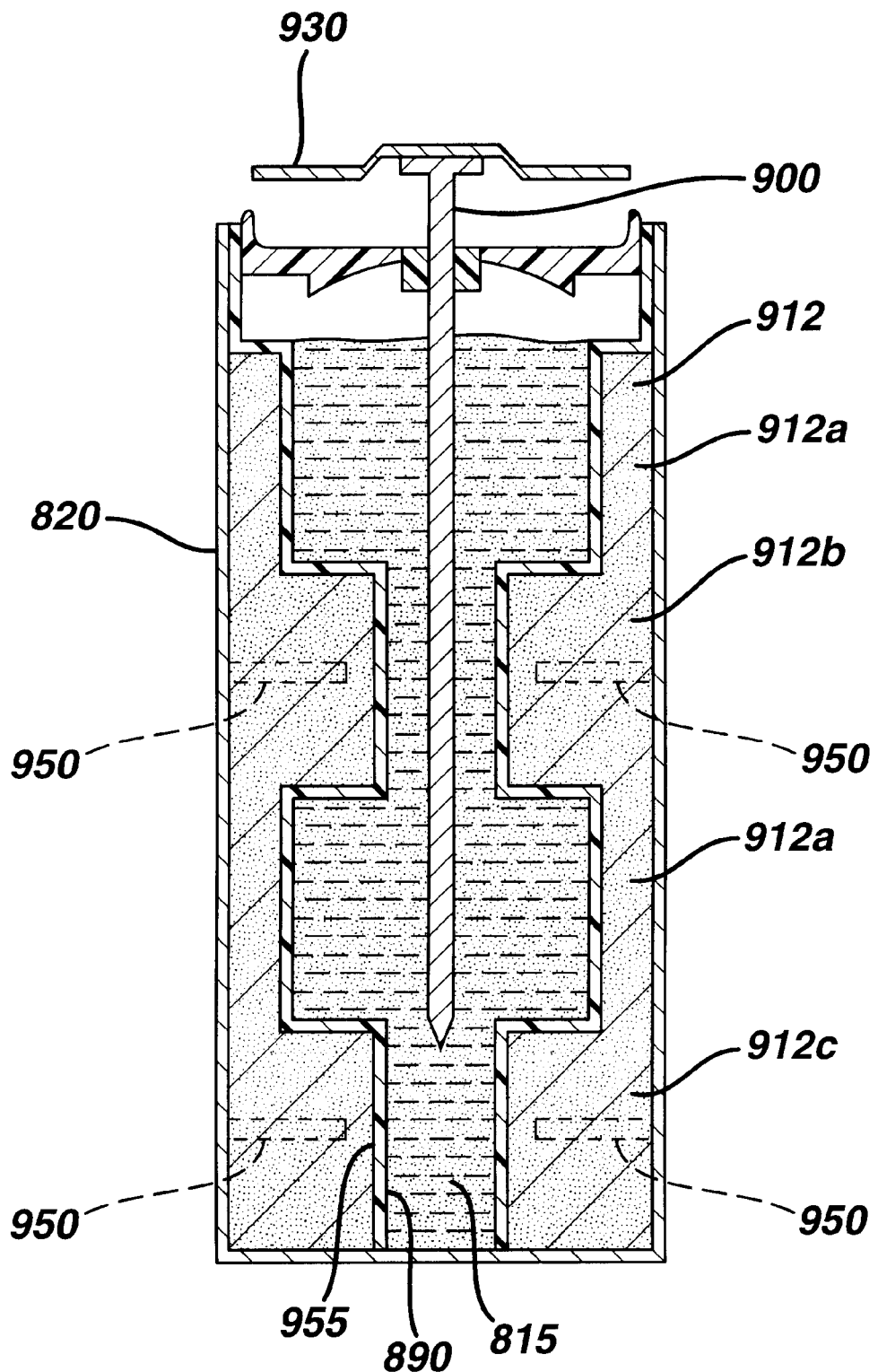
FIG. 5 is a cross sectional elevation view of a prior art alkaline cell having a shaped annular cathode, but with the cathode current collector of the invention penetrating into the cathode.

The cathode current collector of the invention can be employed advantageously in connection with other nonuniform cathode configurations. For example, the cathode current collector of the invention can be employed in connection with the cathode configuration disclosed in International patent publication WO 00/01022, published Jan. 6, 2000. The same cathode configuration is shown in FIG. 5 herein. It will be observed that the cathode inside surface is non-uniform in that it has alternating thick and thin regions along the cathode length. Although it has been reported that such shaped cathode structure results in improved performance of alkaline cells under high power application, it has now been determined that the cell's performance can be enhanced even further by incorporating therein the cathode current collector of the present invention. This can be advantageously accomplished by employing a cathode current collector having a disk shaped structure 950 as shown in FIG. 11. The disk shaped structure can be composed of conductive metal, for example, stainless steel expanded foil (EXMET foil) or carbon, preferably graphite or nickel. The cathode current collector disk 950 can also be of graphite containing carbon fibers therein. The cathode current collectors 950 can be added to thick sections of the cathode 912b and 912c before the cathode 912 is inserted into the cell housing 820 (FIG. 5). Each current collector disk 950 can be located within the cathode thick sections 912b and 912c, preferably so that so one edge thereof will be in close proximity to, more preferably, in contact with the inside of the cell housing 820 when the cathode material 912 is inserted into the housing. During cell discharge, particularly during high power discharge (0.5 to 2.0 Watt), the cathode current collectors 950 increase conductivity within the cathode thick regions 912b and 912c, thereby lowering the cell's overall internal resistance. This results in higher utilization of active material and longer service life. In sum the performance of an alkaline cell having irregularly shaped or indented cathode surface resulting in thick and thin regions within the cathode, whether the thick and thin regions run longitudinally along the cell's length (FIGS. 2,3, and 4) or laterally along the cell's circumference (FIG. 5), can be enhanced by adding the cathode current collectors of the invention (FIGS. 10 and 11).

Figure 5A:
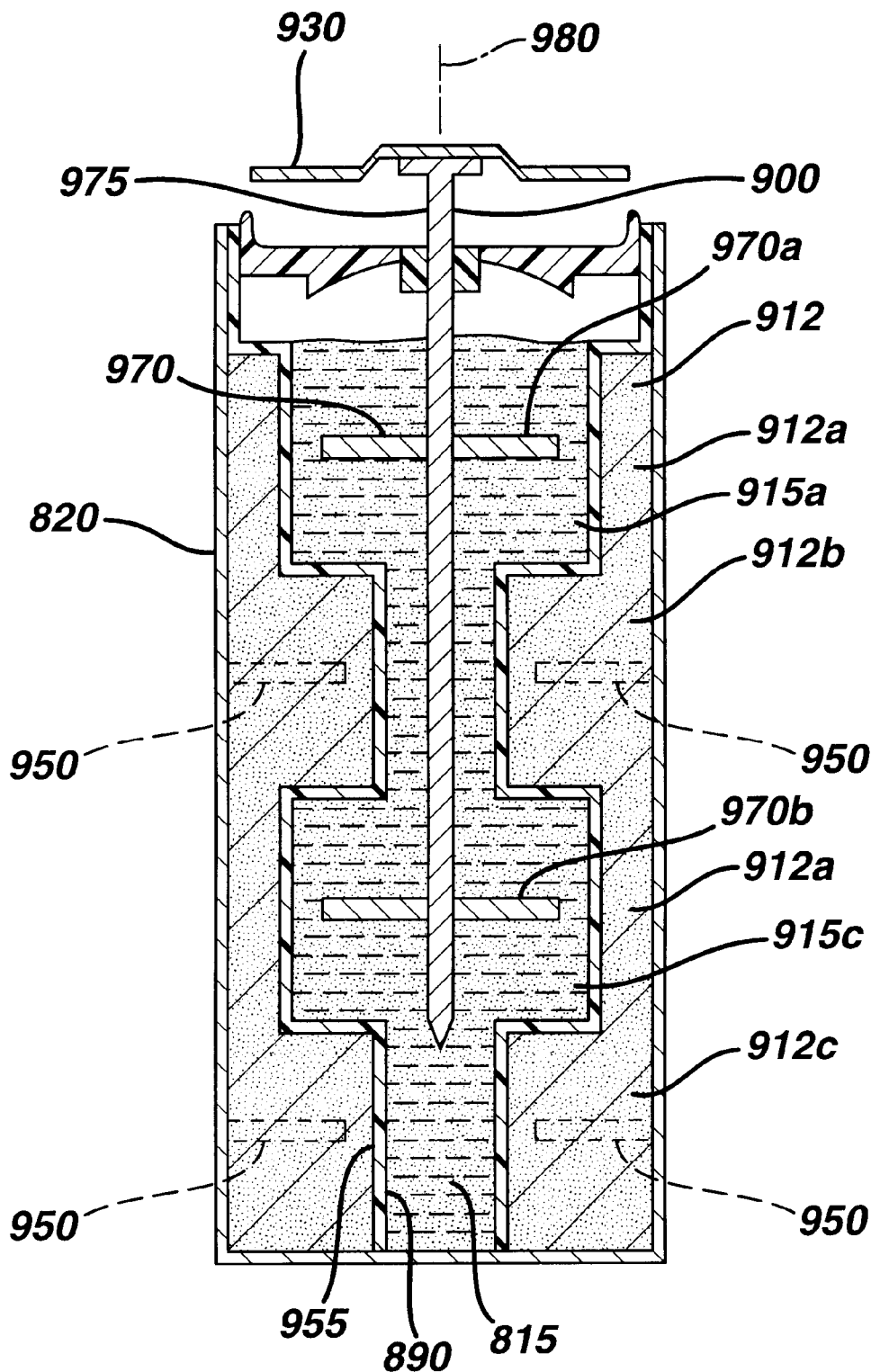
FIG. 5A is a cross sectional elevation view of a prior art alkaline cell having a shaped annular cathode, but with the cathode current collector of the invention penetrating into the cathode and an anode current collector of the invention penetrating into the cathode channels.

The performance of the cell shown in FIG. 5 can be further improved by also including an anode current collector 975 of the invention as shown in FIG. 5A. The alternating thin and thick regions, for example regions 912a and 912b, respectively, of cathode 912 form surface indentations defining lateral channels 915a and 915b as shown in FIG. 5A. Cathode channels 915a and 915b can run circumferentially along the inside surface of cathode 912 as shown in FIG. 5A. The anode current collector 975 has an elongated member 900 centrally disposed, typically along the cell's central longitudinal axis 980. Elongated member 900 has at least one horizontally oriented member 970a, for example, horizontally oriented members 970a and 970b extending outwardly from the elongated member 900. The horizontally disposed members 970a and 970b can be in the form of circular disks oriented at right angles to elongated member 900. The disks 970a and 970b can extend from elongated member 900 to a position adjacent the cathode channels, 915a and 915b, respectfully. Preferably the disks 970a and 970b extend into channels 915a and 915b, respectfully, as shown in FIG. 5A.

A representative primary zinc/manganese dioxide alkaline AA cell 810 can be prepared with particulate manganese dioxide. The AA cell is prepared with a cell housing (housing) 820 formed of steel which is plated on the inside and outside surface with nickel. The inside surface of the housing can be coated with a conductive material for example, with carbon. Conventional cathode and anode mixtures, electrolyte and separator membrane can be employed.

The anode material can be in the form of a gelled mixture containing mercury free (zero-added mercury) zinc alloy powder. Such mixture can typically contain aqueous KOH electrolyte solution, gelling agent, e.g. crosslinked polyacrylic acid copolymer such as CARBOPOL C940 from B. F. Goodrich and hydrolyzed polyacrylonitrile grafted unto a starch backbone available as Waterlock A-221 (Grain Processing Co.); and alkali saponified polyacrylonitrile available as Waterlock A400 (Grain Processing Corp); and surfactants e.g. organic phosphate ester surfactant GAFAC RA600 from Rhone Poulenc. Such mixture is given as illustrative and not intended to restrict the invention. Other representative gelling agents for zinc anodes are disclosed in U.S. Pat. No. 4,563,404. Other organic additives which can be added to zinc slurries are disclosed in European Patent Publication 0474382A1. The separator membrane can be a conventional ion permeable membrane of nonwoven material comprising polyvinylalcohol and cellulosic (rayon) fibrous material. The electrolyte is an aqueous solution of KOH containing about 7–11 Normal KOH and 2 wt % ZnO, hereinafter referred to as "aqueous KOH solution".

The cathode in the cell desirably has the following composition:

Electrolytic manganese dioxide (80–87 wt %), graphite (5–10 wt %), and a 7–10 Normal ("aqueous KOH solution between about 30–40 wt. KOH concentration") (5–7 wt %); polyethylene or polyacrylamide binder (0.1 to 0.5 wt %). The graphite particles preferably have an average particle size of less than abut 20 microns, desirably, between about 2 and 12 microns. The graphite particles can be synthetic or nonsynthetic and they can be expanded or nonexpanded, desirably the latter. The graphite can be obtained, for example, from Brazilian Nacional de Grafite. Such cathode mixtures are intended to be illustrative and non intended to restrict the invention. The electrolytic manganese dioxide is widely available, for example, from Mitsui Chemicals, or Kerr McGee Company.

The anode material desirably has the following composition:.

Zinc alloy powder 62 to 72 wt % (99.9 wt % zinc containing indium), aqueous KOH solution comprising (38 wt % KOH and about 2 wt % ZnO); CARBOPOL C940 (B. F. Goodrich) cross linked acrylic acid polymer gelling agent (between 0.3 and 2 wt %) and Waterlock A-221 (Grain Processing Co.) hydrolyzed polyacrylonitrile grafted unto starch backbone (between 0.01 and 0.5 wt. %; RM-510 (Rhone-Pulenc) dionyl phenol phosphate ester surfactant (50 ppm). The zinc alloy average particle size is desirably between about 30 and 350 micron. The bulk density of the zinc in the anode (anode porosity) is between about 1.75 and 3.5 grams zinc per cubic centimeter of anode. (Zinc real density about 7.14 g/cm$^3$.) The percent by volume of the aqueous electrolyte solution in the anode is between about 65.0 and 75.5 percent by volume of the anode.

The separator can be a conventional ion porous separator comprising an inner layer of nonwoven material of cellulosic (rayon) and polyvinylalcohol fibers and outer layer of cellophane. Such material is illustrative and not intended to restrict the invention. The cells can be balanced in conventional manner so that the mAmp-hr capacity of $MnO_2$ (based on 370 mAmp-hr per gram $MnO_2$) divided by the mAmp-hr capacity of zinc alloy (based on 822 mAmp-hr per gram zinc alloy) is about 1.

A representative alkaline cell configuration is shown in FIG. 1. The alkaline cell 810 comprises a cylindrical steel housing 820, having a closed end 814 and an open end 816. The cell is filled with cathode 812 comprising $MnO_2$, and an anode 815 comprising zinc and electrolyte. The electrolyte in the anode comprises a conventional mixture of aqueous KOH, ZnO and gelling agent. The cathode 812 can be supplied in the form of a series of compacted annular blocks 812a. The cathode blocks 812a are inserted into the cell so that their outside surface contacts the inside surface 850 of housing 820 as shown in FIG. 1. The anode and cathode can be separated by a conventional ion porous separator 890, for example, comprising polyvinylalcohol and cellulosic fibrous material. After cell 810 is filled an insulating plug 860 is inserted into open end 816. Insulating plug 860 may be of polypropylene, talc filled polypropylene, sulfonated polyethylene or nylon. The plug 860 is preferably snap fitted around circumferential step 818 as shown in FIG. 1 so that the plug locks in place into the open end 816. Plug 860 can have an integral coin shaped thinned out portion 867 which is designed to rupture allowing gas to escape therethrough if the gas pressure within the cell builds up to exceed a predetermined level. The peripheral edge 827 of housing 820 is crimped over the top of insulating plug 860. A paper insulating washer 880 is applied over the crimped peripheral edge 827 of housing 820. Insulating washer 880 can be a polyethylene coated paper washer. The anode current collector 500 of the invention can be inserted so that its end penetrates aperture 844. A terminal end cap 830 is welded to form the head of the head of the current collector 500. Current collector 500 is desirably of brass, tin plated brass, bronze, copper or indium plated brass. Conventional asphalt sealant may be preapplied around the current collector 500 before it is inserted into aperture 844. A film label 870 containing printed information can be applied around housing 850. The terminal end cap 830 becomes the negative terminal of alkaline cell 810 and pip 825 at the closed end of housing 820 becomes the positive terminal.

The cell 810 shown in FIG. 1 can be an AA cell. However, the alkaline cell shown in FIG. 1 is not intended to be restricted to any particular size. Thus, the present invention is applicable to AAAA, AAA, AA, C and D size cylindrical alkaline cells as well as button size alkaline cells of any size or shape. Alkaline cell 810 is not intended to be restricted to any particular cell chemistry or cell size. Thus, cell 810 can contain conventional alkaline cell chemistries including those which contain zero added mercury (less than 50 parts mercury per million parts total cell weight, preferably less than 10 parts mercury per million parts total cell weight) and modifications thereof. Such representative chemistries, for example, are disclosed in U.S. Pat. No. 5,401,590, herein incorporated by reference. The cell 810 of the invention also preferably does not contain added amounts of lead and thus can be essentially lead free, that is, the total lead content is less than 30 ppm, desirably less than 15 ppm of total metal content of the anode. Also, although the invention is principally directed to primary alkaline cells the anode and cathode chemistries can be adjusted so that the cells become secondary (rechargeable) cells as is known in the art.

The above cell (FIG. 1) can be an AAAA, AAA, AA, C or D cells. AA size cylindrical test cells were made having the cathode configurations and anode current collectors as above described. The AA cylindrical cell as used herein had standard overall dimensions as given by the American National Standards Institute (ANSI) battery specification ANSI C18.1M, Part 1-1999 as follows: The overall length from positive and negative terminal tips is between 49.2 mm and 50.5 mm and overall outside cell diameter is between 13.5 mm and 14.5 mm. An AA size comparative test cell was first made having the general configuration shown in FIG. 1 employing a four indented cathode configuration as in FIG. 3 and employing a single conventional nail anode current collector of tin plated brass. Other like AA test cells were made with the cathode having the same four indented configuration shown in FIG. 3 but employing the anode current collectors of the invention, all of tin plated brass material. Specifically, the anode collectors shown in FIG. 7 (antenna configuration) and FIG. 9 (with 4 multiple nails) were employed in the AA cells having the four indented cathode shown in FIG. 3. The cathode current collectors, e.g., cathode collectors 250a–250d (FIG. 3) were not employed in these test cells used to generate the performance data given in Table 1.

The amount of zinc and $MnO_2$ active material in the anode and cathode, respectively, as well as the anode and cathode components and composition in each of the test cells (also the comparative cell) was identical. Thus, the theoretical capacity (mAmp-hr) of each cell based on the amount of zinc in the cell was identical. Each of the AA test cells had the following specific cathode composition: $MnO_2$—85.5 wt %; graphite 7.3 wt. percent; aqueous KOH solution (38 wt. % KOH) 6.9 wt %; and polyethylene binder 0.3 wt %. Each of the AA test cells had a bulk density of about 3.1 grams zinc per $cm^3$ anode. The amount of zinc in the anode of each AA cell was 4.00 grams. The anode included about 300 to 500 ppm indium. Zinc real density was 7.14 $g/cm^3$. The zinc comprised 70.0 percent by weight of the anode. The electroyte solution was at a concentration of 38 wt. % KOH (9 Normal) and comprised 1.72 grams in the anode. The percent by volume of the aqueous electrolyte solution in the anode was thus about 69 percent by volume of the anode. The cells were balanced so that the mAmp-hr capacity of $MnO_2$ (based on 370 mAmp-hr per gram $MnO_2$) divided by the mAmp-hr capacity of zinc (based on 822 mAmp-hr per gram zinc) was 1.05. Anode theoretical capacity for each of the AA cells was 3.29 Amp-hrs.

The test cells were all discharged under high continuous current drain of 1 Amp to a cut off voltage of 1.0 Volt, thus reflecting general usage in high power applications. The actual capacity (mAmp-hours), and energy output (Watthours) for each of the test cells is reported in Table 1.

TABLE 1

PERFORMANCE TEST RESULTS
AA CELLS DISCHARGED
AT 1.0 AMP TO 1.0 VOLT CUTOFF

|  | Capacity Amp-Hrs | Energy Watt-Hrs |
|---|---|---|
| Comparative Cell (4 indented cathode and single anode nail) | 0.93 | 1.02 |
| Test Cells No. 1 (4 indented cathode and anode current collector of FIG. 7) | 1.03 | 1.19 |

TABLE 1-continued

PERFORMANCE TEST RESULTS
AA CELLS DISCHARGED
AT 1.0 AMP TO 1.0 VOLT CUTOFF

|  | Capacity Amp-Hrs | Energy Watt-Hrs |
|---|---|---|
| Test Cells No. 2 (4 indented cathode and anode current collector of FIG. 9 using four nails) | 1.01 | 1.18 |

The performance data in Table 1 reveals that the percent improvement in capacity for Test Cell No. 1 over the Comparative Cell was 10.8% and the percent improvement in capacity of Test Cell No. 2 over the Comparative Cell was 8.6%. The percent improvement in energy output for Test Cell No. 1 over the Comparative Cell was 16.7% and the percent improvement in energy output for Test Cell No. 2 over the Comparative Cell was 15.7%. This demonstrates the effectiveness of the cells made in accordance with the invention.

Another set of AA size test cells (Test Cells No. 3) having the same anode and cathode composition and same theoretical capacity (based on zinc) were prepared. These cells had the same anode and cathode composition and about the same amount of zinc and $MnO_2$ active material as in the tests cells used to generate the data in Table 1. However, the test cells now employed the disk shaped cathode current collectors 950 of the invention and used a single tin plated brass nail as the anode current collector. The cathode in the test cells was formed of four cathode disks 812a (FIG. 13) stacked one on top of the other. The cathode disks 812a each had a smooth (nonindented) inside surface. A cathode current collector disk 950 of the invention was inserted between each of the stacked cathode disks so that each of the cathode disks 950 (three in total) were aligned radially, namely, perpendicular to the cell's longitudinal axis 845. Each of the cathode current collector disks 950 was composed of a composite of graphite with carbon fibers dispersed therein. The cathode current collector disks 950 each had a thickness of 0.2 mm. The outer edge of each cathode current collector disk was in contact with the cell housing 820 as shown in FIG. 13. A comparative cell having the same construction and same anode and cathode composition was prepared but the cathode current collector disks 950 were not included. The cells were discharged at 1 Amp continuous drain to cut off voltages of 1.0 and 0.8 volt. The capacity (Amp-hrs) and energy output (watt-hrs) were tabulated and are presented in Table 2. In all cases improvement in capacity and energy output was realized with the cells incorporating the disk cathode current collectors of the invention.

TABLE 2

PERFORMANCE TEST RESULTS

|  | Capacity Amp-Hrs | Energy Watt-Hrs |
|---|---|---|
| AA CELLS DISCHARGED AT 1.0 AMP TO 1.0 VOLT CUTOFF | | |
| Comparative Cell (nonindented smooth cathode and single anode nail) | 0.48 | 0.54 |
| Test Cells No. 3 (nonindented smooth cathode with single anode nail and disk cathode current collector of FIG. 11) | 0.57 | 0.64 |
| AA CELLS DISCHARGED AT 1.0 AMP TO 0.8 VOLT CUTOFF | | |
| Comparative Cell (nonindented smooth cathode and single anode nail) | 0.87 | 0.90 |
| Test Cells No. 3 (nonindented smooth cathode with single anode nail and disk cathode current collector of FIG. 11) | 0.98 | 1.02 |

Another set of AA size test cells (Test Cells No. 4) having the same anode and cathode composition and same theoretical capacity (based on zinc) were prepared. These cells had the same anode and cathode composition and about the same amount of zinc and $MnO_2$ active material as in the tests cells used to generate the data in Table 1. However, the test cells now employed the disk shaped cathode current collectors 1050 (FIG. 12) of the invention and used a single tin plated brass nail as the anode current collector. The cathode of the test cells was formed of a one piece cathode disk 812a (FIG. 14). The cathode inside surface had a five indentation configuration as shown and described with respect to FIG. 4. Five equispaced cathode current collector disks 1050 were inserted within the cathode during cathode fabrication so that each of the cathode disks 1050 would be aligned radially, namely, perpendicular to the cell's longitudinal axis 845. Each of the cathode current collector disks 1050 was composed of nickel mesh having a thickness of 0.1 mm. When the cathode was inserted into the housing 820 the outer edge of each cathode current collector disks was in contact with the housing as shown in FIG. 14. A comparative cell having the same construction and same anode and cathode composition was prepared but the cathode current collector disks 1050 were not included. The cells were discharged at 1 Amp continuous drain to cut off voltages of 1.0 and 0.8 volt. The capacity (Amp-hrs) and energy output (watt-hrs) were tabulated and are presented in Table 3. In all cases improvement in capacity and energy output was realized with the cells incorporating the disk cathode current collectors of the invention.

TABLE 3

PERFORMANCE TEST RESULTS

|  | Capacity Amp-Hrs | Energy Watt-Hrs |
|---|---|---|
| AA CELLS DISCHARGED AT 1.0 AMP TO 1.0 VOLT CUTOFF | | |
| Comparative Cell (5 indented cathode and single anode nail) | 0.60 | 0.69 |
| Test Cells No. 4 (5 indented cathode with single anode nail and disk cathode current collector of FIG. 12) | 0.73 | 0.83 |
| AA CELLS DISCHARGED AT 1.0 AMP TO 0.8 VOLT CUTOFF | | |
| Comparative Cell (5 indented cathode and single anode nail) | 1.09 | 1.14 |

TABLE 3-continued

PERFORMANCE TEST RESULTS

| | Capacity Amp-Hrs | Energy Watt-Hrs |
|---|---|---|
| Test Cells No. 4 (5 indented cathode with single anode nail and disk cathode current collector of FIG. 12) | 1.13 | 1.21 |

Another set of AA size test cells (Test Cells No. 5) having the same anode and cathode composition and same theoretical capacity (based on zinc) were prepared. These cells had the same anode and cathode composition and about the same amount of zinc and $MnO_2$ active material as in the tests cells used to generate the data in Table 1. However, the test cells now employed the vertical sheet cathode current collectors 350a–350e (FIG. 4) of the invention and used a single tin plated brass nail as the anode current collector. The cathode of the test cells was formed of an elongated cathode 812 (FIG. 4) formed in one piece. The cathode inside surface had a five indentation configuration as shown and described with respect to FIG. 4. Five equispaced cathode current collector sheets 350a–350e having a configuration shown in FIG. 10 were inserted within the cathode during cathode fabrication so that each of the cathode current collector sheets would be aligned vertically, namely, parallel to the cell's longitudinal axis 845. Each of the cathode current collector sheets was composed of nickel having a thickness of 0.1 mm. When the cathode was inserted into the housing 820 the edge of each cathode current collector sheet 350a–350e closest to the housing was about 1.3 mm from the housing. A comparative cell having the same construction and same anode and cathode composition was prepared but the cathode current collector sheets were not included. The cells were discharged at 1 Amp continuous drain to cut off voltages of 1.0 and 0.8 volt. The capacity (Amp-hrs) and energy output (watt-hrs) were tabulated and are presented in Table 4. In all cases improvement in capacity and energy output was realized with the cells incorporating the sheet cathode current collectors of the invention.

TABLE 4

PERFORMANCE TEST RESULTS

| | Capacity Amp-Hrs | Energy Watt-Hrs |
|---|---|---|
| AA CELLS DISCHARGED AT 1.0 AMP TO 1.0 VOLT CUTOFF | | |
| Comparative Cell (5 indented cathode and single anode nail) | 0.26 | 0.31 |
| Test Cells No. 5 (5 indented cathode with single anode nail and Ni sheet cathode current collectors) | 0.37 | 0.45 |
| AA CELLS DISCHARGED AT 1.0 AMP TO 0.8 VOLT CUTOFF | | |
| Comparative Cell (5 indented cathode and single anode nail) | 0.37 | 0.39 |
| Test Cells No. 5 (5 indented cathode with single anode nail and Ni sheet cathode current collectors) | 0.60 | 0.64 |

Although the present invention has been described with reference to specific embodiments, it should be appreciated that variations are possible without departing from the concept of the invention. Accordingly, the present invention is not intended to be limited by the specific embodiments described herein but rather will be defined by the claims and equivalents thereof.

What is claimed is:

1. An alkaline cell having a housing, an anode material comprising zinc and a cathode material comprising manganese dioxide, and an alkaline electrolyte, wherein the cathode is located annularly along a major portion of the length of the inside surface of the housing, wherein the cathode comprises an outer surface and an inside surface, the cathode outer surface contacting the housing and the cathode inside surface facing the cell's interior, wherein the cathode inside surface comprises at least one surface indentation, wherein the surface indentation comprises a channel bounded by a portion of the cathode inside surface, said channel facing the cell's interior, wherein said cell comprises an anode current collector within said anode, wherein a first portion of said anode current collector is positioned away from said channel and a second portion of said anode current collector extends into said channel without contacting said cathode.

2. The cell of claim 1 wherein said surface indentation comprises a curved surface.

3. An alkaline cell having a housing, an anode material comprising zinc and a cathode material comprising manganese dioxide, and an alkaline electrolyte, wherein the cathode is located annularly along a major portion of the length of the inside surface of the housing, wherein the cathode comprises an outer surface and an inside surface, the cathode outer surface contacting the housing and the cathode inside surface facing the cell's interior, wherein the cathode inside surface comprises at least one surface indentation, wherein said indentation is a longitudinal indentation parallel to the cell's central longitudinal axis, wherein the surface indentation comprises a channel bounded by a portion of the cathode inside surface, said channel facing the cell's interior, wherein said cell comprises an anode current collector within said anode, wherein a first portion of said anode current collector is positioned away from said channel and a second portion of said anode current collector extends into said channel without contacting said cathode.

4. The cell of claim 3 wherein said anode current collector comprises an electrically conductive metal and has an axis of symmetry parallel to the cell's longitudinal axis.

5. The cell of claim 3 including an ion permeable separator.

6. The cell of claim 3 wherein the cathode inside surface is lined with an ion permeable separator.

7. An alkaline cell having a housing, an anode material comprising zinc and a cathode material comprising manganese dioxide, and an alkaline electrolyte, wherein the cathode is located annularly along a major portion of the length of the inside surface of the housing, wherein the cathode comprises an outer surface and an inside surface, the cathode outer surface contacting the housing and the cathode inside surface facing the cell's interior, wherein the cathode inside surface comprises at least one surface indentation parallel to the cell's central longitudinal axis, wherein the surface indentation comprises a channel bounded by a portion of the cathode inside surface, said channel facing the cell's interior, wherein said surface indentation has an opening running along the length of said surface indentation, wherein said opening permits access into said channel from the cell's interior, wherein said cell comprises an anode current collector within said anode, wherein a first portion of said anode current collector is positioned away from said channel and a second portion of said anode current collector extends from the anode interior to within said channel through said opening without contacting said cathode.

8. The cell of claim 7 wherein said second portion of said anode current collector has a surface extending from the cell's central longitudinal axis to within said channel.

9. The cell of claim 7 wherein said second portion of said anode current collector has a surface extending from the anode interior to within said channel and wherein a portion of said current collector surface runs along the length of said channel.

10. The cell of claim 7 wherein said second portion of said anode current collector has a surface extending from the cell's central longitudinal axis to within said channel and said surface runs along the length of said channel.

11. The cell of claim 10 wherein a portion of said anode current collector lies along the longitudinal axis of symmetry of said channel.

12. An alkaline cell having a housing, an anode material comprising zinc and a cathode material comprising manganese dioxide, and an alkaline electrolyte, wherein the cathode is located annularly along a major portion of the length of the inside surface of the housing, wherein the cathode comprises an outer surface and an inside surface, the cathode outer surface contacting the housing and the cathode inside surface facing the cell's interior, wherein the cathode inside surface comprises a plurality of longitudinal surface indentations, wherein each of the surface indentations comprises a channel bounded by a portion of the cathode inside surface, said channel facing the cell's interior, wherein said cell comprises an anode current collector within said anode, wherein a first portion of said anode current collector is positioned away from said channel and a second portion of said anode current collector extends into each of said channels without contacting said cathode.

13. The cell of claim 12 wherein said indentations are symmetrically located around the circumference of the cathode inside surface.

14. The cell of claim 12 wherein the cathode inside surface comprises a pair of oppositely facing surface indentations.

15. The cell of claim 12 wherein the cathode inside surface comprises four longitudinal surface indentations.

16. The cell of claim 12 wherein the cathode inside surface comprises five longitudinal surface indentations.

17. An alkaline cell having a cylindrical housing, an anode material comprising zinc and a cathode material comprising manganese dioxide, and an alkaline electrolyte, wherein the cathode is located annularly along a major portion of the length of the inside surface of the housing, wherein the cathode comprises an outer surface and an inside surface, the cathode outer surface contacting the housing and the cathode inside surface facing the cell's interior, wherein the cathode inside surface comprises at least one longitudinal surface indentation having an opening running in the direction of the cell's length, wherein said cell comprises an anode current collector within said anode, wherein said anode current collector extends into said opening to penetrate the space defined by said surface indentation without contacting the cathode, wherein said alkaline cell further comprises a cathode current collector member residing within said cathode.

18. The cell of claim 17 wherein a portion of said cathode current collector contacts said housing.

19. The cell of claim 17 wherein the cathode current collector member comprises a metal sheet.

20. The cell of claim 17 wherein the cathode current collector member comprises a metal sheet comprising stainless steel expanded foil.

21. The cell of claim 17 wherein the cathode current collector member comprises a metal sheet comprising nickel.

22. The cell of claim 17 wherein the cathode current collector member comprises a sheet comprising graphite.

23. The cell of claim 17 wherein the cathode current collector member comprises a sheet comprising graphite and carbon fibers.

24. The cell of claim 17 comprising a plurality of longitudinal surface indentations on the inside surface of said cathode, said indentations defining alternating thick and thin regions within the cathode when the cathode is viewed in cross section taken perpendicular to the cell's central longitudinal axis, wherein the cathode current collector is located within at least one of said cathode thick regions.

25. The cell of claim 24 comprising a plurality of cathode current collectors, wherein each of said thick regions comprises one of said cathode current collectors therein.

26. The cell of claim 24 wherein the cathode current collector is a sheet inserted within the cathode and runs along a major portion of the length of the cathode.

27. The cell of claim 17 wherein the cathode current collector comprises an electrically conductive disk inserted within the cathode and oriented perpendicular to the cell's central longitudinal axis.

* * * * *